United States Patent
Takeda et al.

(10) Patent No.: US 8,013,808 B2
(45) Date of Patent: Sep. 6, 2011

(54) METHOD OF DRIVING PLASMA DISPLAY PANEL, AND PLASMA DISPLAY DEVICE

(75) Inventors: Minoru Takeda, Osaka (JP); Shigeo Kigo, Osaka (JP); Takeru Yamashita, Osaka (JP); Tooru Kawase, Osaka (JP)

(73) Assignee: Panasonic Corporation, Osaka (JP)

( * ) Notice: Subject to any disclaimer, the term of this patent is extended or adjusted under 35 U.S.C. 154(b) by 230 days.

(21) Appl. No.: 11/815,899

(22) PCT Filed: Feb. 20, 2007

(86) PCT No.: PCT/JP2007/053084
§ 371 (c)(1),
(2), (4) Date: Aug. 9, 2007

(87) PCT Pub. No.: WO2007/097328
PCT Pub. Date: Aug. 30, 2007

(65) Prior Publication Data
US 2009/0021452 A1  Jan. 22, 2009

(30) Foreign Application Priority Data
Feb. 24, 2006 (JP) .................. 2006-048239

(51) Int. Cl.
*G09G 3/28* (2006.01)
(52) U.S. Cl. ............ 345/63; 345/60; 345/61; 345/62; 345/65; 345/66; 345/72; 345/214; 345/169.4
(58) Field of Classification Search ............ 345/6–73; 315/169.4; 313/483
See application file for complete search history.

(56) References Cited

U.S. PATENT DOCUMENTS

| 6,294,875 | B1 | 9/2001 | Kurata et al. | |
|---|---|---|---|---|
| 6,400,346 | B2 * | 6/2002 | Kasahara et al. | 345/63 |
| 7,567,229 | B2 * | 7/2009 | Kasai et al. | 345/89 |
| 7,583,240 | B2 | 9/2009 | Yamashita et al. | |
| 2003/0001804 | A1 * | 1/2003 | Naganuma | 345/63 |
| 2006/0066519 | A1 * | 3/2006 | Tokunaga et al. | 345/63 |

FOREIGN PATENT DOCUMENTS

CN  2007800004693  10/2009

(Continued)

OTHER PUBLICATIONS

International Search Report for Application No. PCT/JP2007/053084, dated Mar. 27, 2007.

(Continued)

*Primary Examiner* — Lun-Yi Lao
*Assistant Examiner* — Olga Merkoulova
(74) *Attorney, Agent, or Firm* — RatnerPrestia

(57) ABSTRACT

A panel driving method has, in one filed time period, an all-cell initializing subfield for causing initializing discharge in all discharge cells for displaying an image in the initializing period, and a selection initializing subfield for selectively causing initializing discharge in the discharge cell that has caused sustaining discharge in the last subfield in the initializing period. The number of all-cell initializing subfields can be increased and decreased, and the initializing voltage for causing initializing discharge in the all-cell initializing subfield can be varied. At least one of the number of all-cell initializing subfields and the initializing voltage of the all-cell initializing subfields in one field is controlled based on the accumulation of the panel power-on time.

4 Claims, 17 Drawing Sheets

FOREIGN PATENT DOCUMENTS

| | | | |
|---|---|---|---|
| JP | 2000-242224 A | 9/2000 | |
| JP | 2000-242224 A | 9/2000 | |
| JP | 2002-366088 A | 12/2002 | |
| JP | 2005-215132 A | 8/2005 | |
| JP | 2005-215132 A | 8/2005 | |
| JP | 2005-234372 A | 9/2005 | |
| JP | 2005-241806 A | 9/2005 | |
| JP | 2005-241806 A | 9/2005 | |
| JP | 2005-338217 A | 12/2005 | |
| JP | 2006-003398 A | 1/2006 | |
| KR | 2003-0072797 A | 9/2003 | |
| KR | 10-2004-0013161 | 2/2004 | |

OTHER PUBLICATIONS

English translation of Form PCT/ISA/210.
JP Office Action for 2007-525513, Jul. 27, 2010, p. 2 references Cite Nos. 2, 3 4.
JP Office Action for 2007-525513, Nov. 30, 2010, p. 2, references Cite Nos. 1, 2, 3 & 4.

* cited by examiner

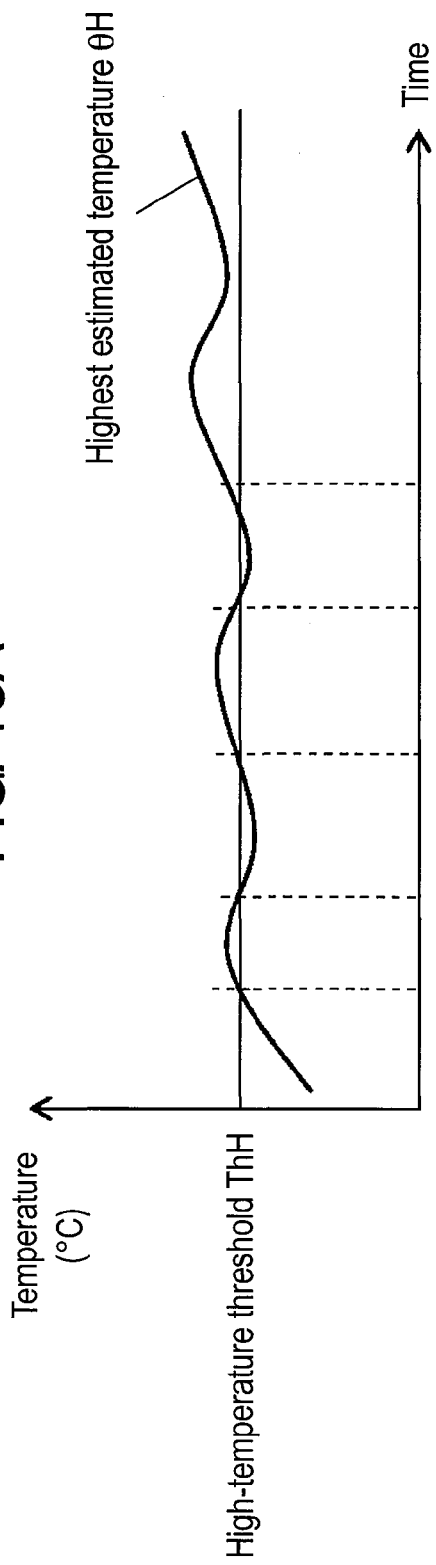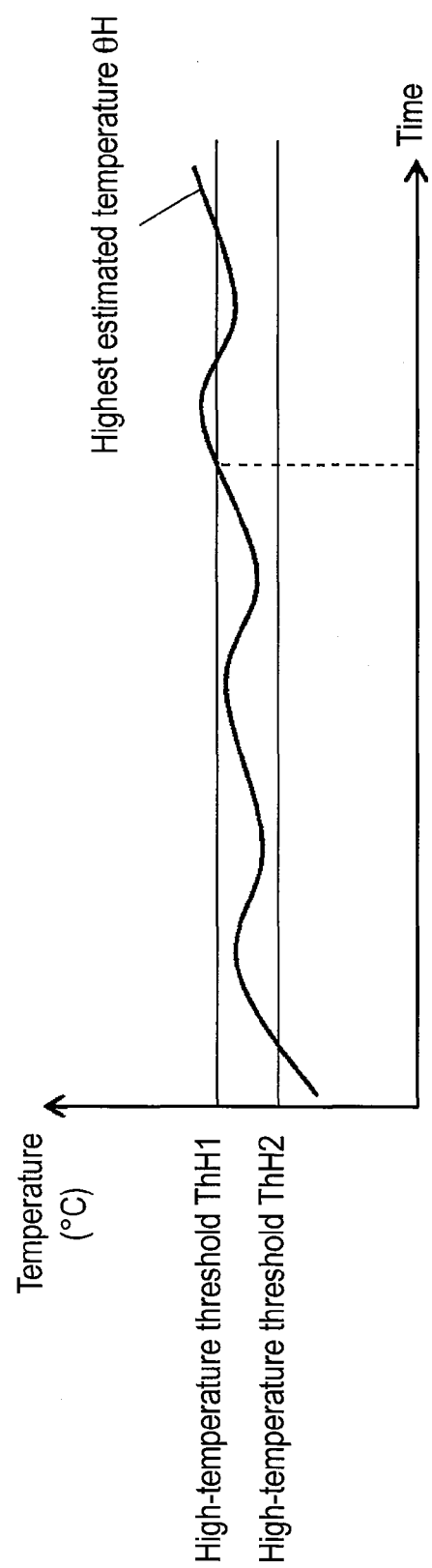

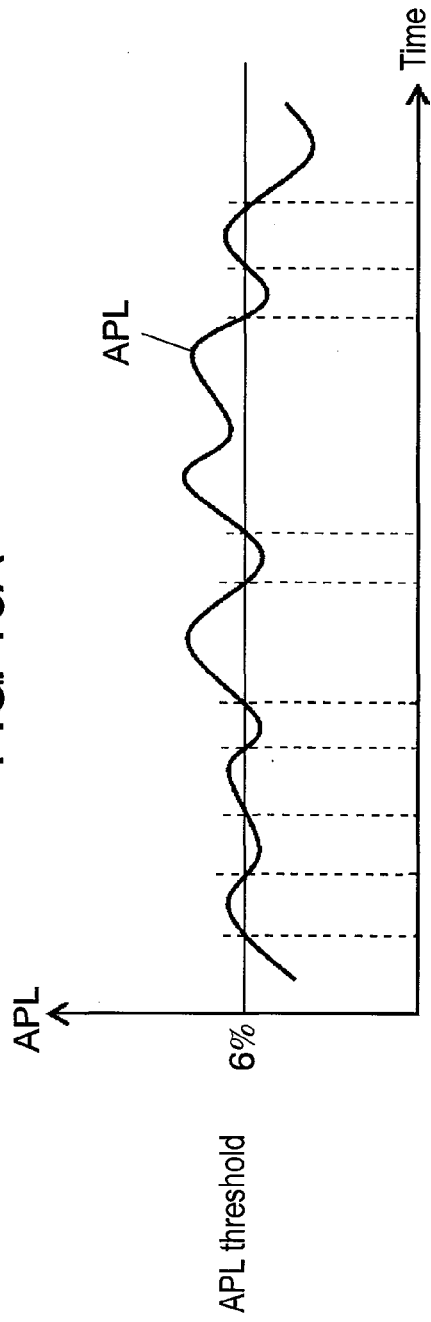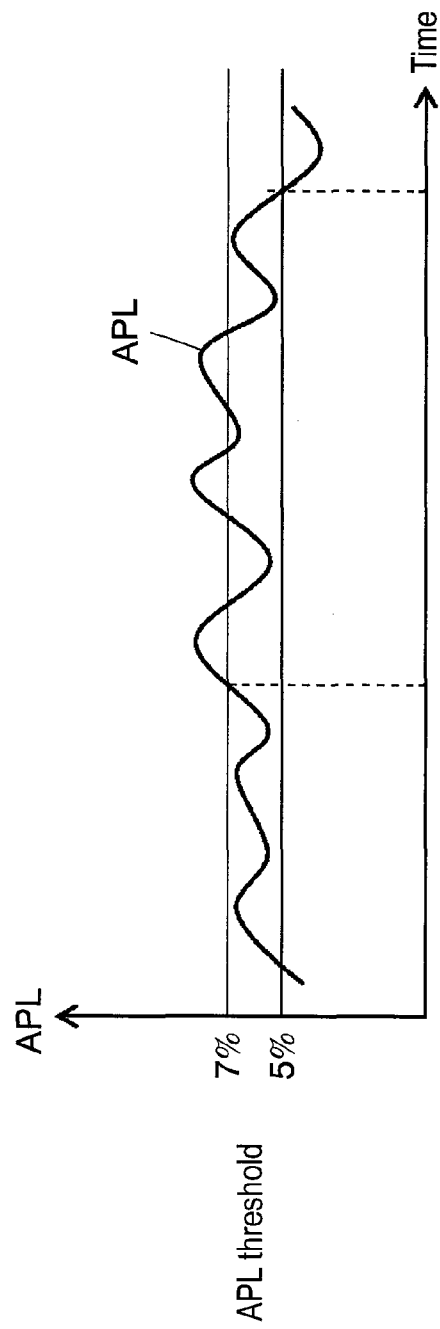

METHOD OF DRIVING PLASMA DISPLAY PANEL, AND PLASMA DISPLAY DEVICE

This application is a U.S. National Phase Application of PCT International Application PCT/JP2007/053084.

TECHNICAL FIELD

The present invention relates to a plasma display device used in a wall-hanging television (TV) or a large monitor, and a driving method of a plasma display panel.

BACKGROUND ART

A typical alternating-current surface discharge type panel used as a plasma display panel (hereinafter referred to as "panel") has many discharge cells between a front plate and a back plate that are faced to each other.

The front plate has the following elements:
  a plurality of display electrode pairs disposed in parallel on a front glass substrate; and
  a dielectric layer and a protective layer for covering the display electrode pairs.

Here, each display electrode pair is formed of a pair of scan electrode and sustain electrode. The back plate has the following elements:
  a plurality of data electrodes disposed in parallel on a back glass substrate;
  a dielectric layer for covering the data electrodes;
  a plurality of barrier ribs disposed on the dielectric layer in parallel with the data electrodes; and
  phosphor layers disposed on the surface of the dielectric layer and on side surfaces of the barrier ribs.

The front plate and back plate are faced to each other so that the display electrode pairs and the data electrodes three-dimensionally intersect, and are sealed. Discharge gas containing xenon with a partial pressure of 5%, for example, is filled into a discharge space in the sealed product. Discharge cells are disposed in intersecting parts of the display electrode pairs and the data electrodes. In the panel having this structure, ultraviolet rays are emitted by gas discharge in each discharge cell. The ultraviolet rays excite respective phosphors of red (R), green (G), and blue (B) to emit light, and thus provide color display.

A subfield method is generally used as a method of driving the panel. In this method, one field time period is divided into a plurality of subfields (hereinafter referred to as "SF"), and the subfields at which light is emitted are combined, thereby performing gradation display.

Each subfield has an initializing period, an addressing period, and a sustaining period. In the initializing period, initializing discharge is performed to form a wall charge required for a subsequent writing operation on each electrode. The initializing operation includes an initializing operation (hereinafter referred to as "all-cell initializing operation") of causing initializing discharge in all discharge cells, and an initializing operation (hereinafter referred to as "selection initializing operation") of causing initializing discharge in a discharge cell having performed sustaining discharge.

In the writing time period, writing discharge is selectively caused to form a wall charge in a discharge cell where display is to be performed. In the sustaining period, sustain pulses are alternately applied to the display electrode pairs formed of the scan electrodes and the sustain electrodes, sustaining discharge is caused in the discharge cell having performed writing discharge, and a phosphor layer of the corresponding discharge cell is light-emitted, thereby displaying an image.

Of the subfield method, a new driving method is disclosed. In this driving method, the initializing discharge is performed using a gently varying voltage waveform, and the initializing discharge is selectively applied to the discharge cell having performed sustaining discharge. Thus, light emission that is not related to the gradation display is minimized, and the contrast ratio is improved.

Specifically, in the initializing period of one of a plurality of subfields, for example, the all-cell initializing operation of causing discharge from all discharge cells is performed. In the initializing period of the other subfield, the selection initializing operation of initializing only the discharge cell having performed sustaining discharge is performed. As a result, light emission that is not related to the display is only the light emission accompanying the discharge of the all-cell initializing operation, and an image having sharp contrast can be displayed (e.g. patent document 1).

This driving manner allows image display of sharp contrast, because the luminance (hereinafter referred to as "black luminance") in a black display region during the light emission that is not related to the image display, namely during non-display of video, is only due to weak light emission in the all-cell initializing operation.

The number of discharge cells has been increased in response to the improvement of the definition of the panels and the enlargement of the screen, and the number of subfields is increased for improving the false outline of moving pictures and the image display quality, so that the speed-up of the writing operation is further demanded.

The all-cell initializing operation of initializing all discharge cells also forms wall charge required for the writing operation as discussed above, reduces the discharge delay, and generates priming in order to stably cause writing discharge. Therefore, for speeding up the writing operation, a method of increasing the priming is effective. When the number of subfields (hereinafter referred to as "the number of all-cell initializations") where the all-cell initializing operation is performed in one field time period is increased, however, the black luminance increases to degrade the contrast and image display quality.

Therefore, another panel driving method is proposed (e.g. patent document 2). In this method, the initializing operation in the initializing period of each subfield is determined to be the all-cell initializing operation or the selection initializing operation based on the Average Picture Level (APL) of an image signal to be displayed, thereby increasing or decreasing the number of all-cell initializations. This method allows stable and high-speed writing while suppressing the increase in black luminance.

However, the wall charge and priming generated by the all-cell initializing operation largely depend on the discharge characteristics such as discharge start voltage, and the discharge characteristics depend on the temperature of the panel. Even when the above-mentioned driving method is employed, the temperature range is disadvantageously restricted to some extent where driving of a panel allowing stable and high-speed writing while the increase in black luminance is suppressed can be performed. Additionally, the discharge characteristics of the panel depend on power-on accumulated time, so that a plasma display device cannot be easily controlled on an optimal condition, from the initial stage of its use, and regardless of the power-on accumulated time.

[Patent document 1] Japanese Patent Unexamined Publication No. 2000-242224

[Patent document 2] Japanese Patent Unexamined Publication No. 2005-215132

SUMMARY OF THE INVENTION

The present invention provides a panel driving method that has the following subfields in one filed time period:
- an all-cell initializing subfield for causing initializing discharge in all discharge cells that display an image in the initializing period; and
- a selection initializing subfield for selectively causing initializing discharge in the discharge cell that has caused sustaining discharge in the last subfield in the initializing period.

The number of all-cell initializing subfields can be increased and decreased, the initializing voltage for causing initializing discharge in the all-cell initializing subfield can be varied. At least one of the number of all-cell initializing subfields and the initializing voltage in the all-cell initializing subfields in one field is controlled based on the accumulation of the panel power-on time. This method allows stable and high-speed writing while suppressing the increase in black luminance in a large temperature range, from the initial stage of the use, and regardless of the power-on accumulated time.

In the panel driving method of the present invention, a lowest estimated temperature and a highest estimated temperature of the panel are estimated based on the temperature around the panel, and at least one of the number of all-cell initializing subfields and the initializing voltage thereof in one field may be controlled based on the lowest estimated temperature, highest estimated temperature, and accumulated time.

In the panel driving method of the present invention, average luminance of the image signals in one filed time period or one frame time period may be detected, and at least one of the number of all-cell initializing subfields and the initializing voltage thereof in one field may be controlled based on the average luminance and the accumulated time.

The plasma display device of the present invention has the following elements:
- a panel having a plurality of discharge cells having a display electrode pair that is formed of a scan electrode and a sustain electrode;
- an accumulated time measuring circuit for measuring the power-on accumulated time of the panel; and
- a driving circuit for driving the panel in a subfield structure where one field includes an all-cell initializing subfield and a selection initializing subfield.

Here, the all-cell initializing subfield causes initializing discharge in all discharge cells that display an image in the initializing period. The selection initializing subfield selectively causes initializing discharge in the discharge cell that has caused sustaining discharge in the last subfield in the initializing period. The driving circuit controls at least one of the number of all-cell initializing subfields and the initializing voltage in the all-cell initializing subfields in one field based on the accumulated time measured by the accumulated time measuring circuit.

BRIEF DESCRIPTION OF DRAWINGS

FIG. 15A shows an example of the relationship between the highest estimated temperature and the high-temperature threshold in accordance with the second exemplary embodiment.

FIG. 15B shows another example of the relationship between the highest estimated temperature and the high-temperature threshold in accordance with the second exemplary embodiment.

FIG. 16A shows an example of the relationship between the APL and the number of all-cell initializations in accordance with the second exemplary embodiment.

FIG. 16B shows another example of the relationship between the APL and the number of all-cell initializations in accordance with the second exemplary embodiment.

DETAILED DESCRIPTION OF PREFERRED EMBODIMENTS

Plasma display devices in accordance with exemplary embodiments of the present invention will be described hereinafter with reference to the accompanying drawings.

First Exemplary Embodiment

Figure 1:
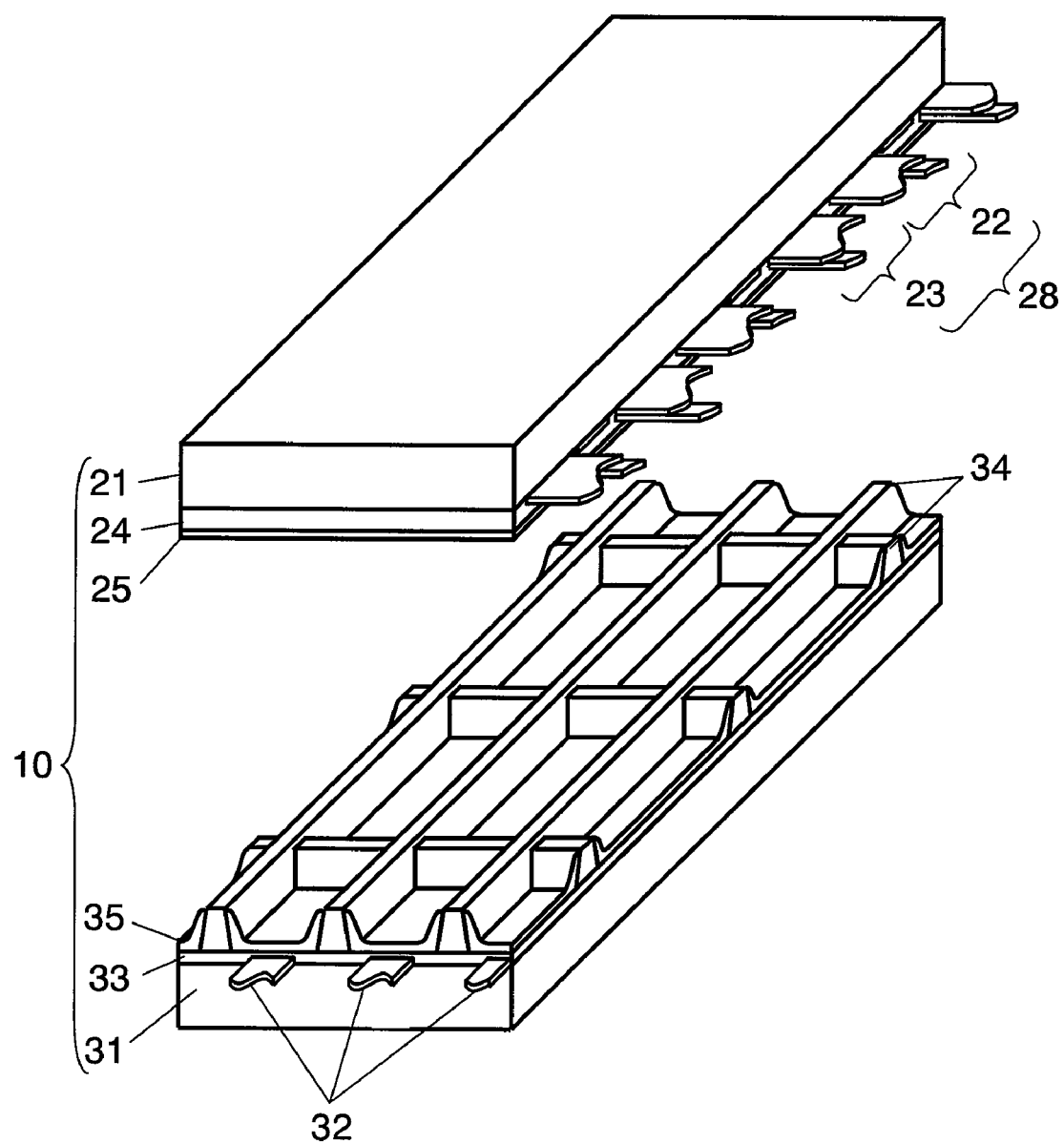
FIG. 1 is an exploded perspective view showing a structure of a panel in accordance with a first exemplary embodiment of the present invention.

FIG. 1 is an exploded perspective view showing a structure of panel 10 in accordance with exemplary embodiment 1 of the present invention. A plurality of display electrode pairs 28 formed of scan electrodes 22 and sustain electrodes 23 are disposed on glass-made front plate 21. Dielectric layer 24 is formed so as to cover scan electrodes 22 and sustain electrodes 23, and protective layer 25 is formed on dielectric layer 24. A plurality of data electrodes 32 are formed on back plate 31, dielectric layer 33 is formed so as to cover data electrodes 32, and curb-like barrier ribs 34 are formed on dielectric layer 33. Phosphor layers 35 for emitting lights of respective colors of red (R), green (G), and blue (B) are formed on the side surfaces of barrier ribs 34 and on dielectric layer 33.

Front plate 21 and back plate 31 are faced to each other so that display electrode pairs 28 cross data electrodes 32 with a micro discharge space sandwiched between them, and the outer peripheries of them are sealed by a sealing material such as glass frit. The discharge space is filled with discharge gas of neon and xenon, for example. In the present embodiment, the mixed gas with a xenon partial pressure of 10% is used in order to improve luminance. The discharge space is partitioned into a plurality of sections by barrier ribs 34. Discharge cells are formed in the intersecting parts of display electrode pairs 28 and data electrodes 32. The discharge cells discharge and emit light to display an image.

The structure of panel 10 is not limited to the above-mentioned one, but may be a structure having striped barrier ribs, for example.

Figure 2:
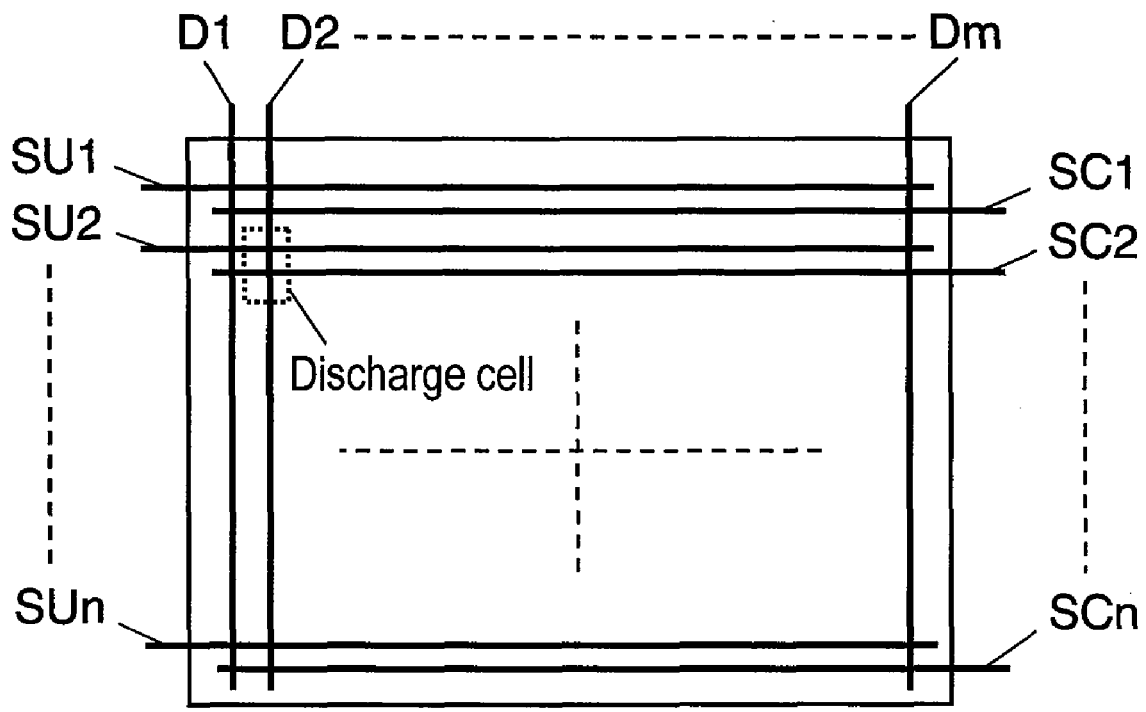
FIG. 2 is an electrode array diagram of the panel.

FIG. 2 is an electrode array diagram of panel 10 in accordance with exemplary embodiment 1 of the present invention. In panel 10, n long scan electrodes SC1 through SCn (scan electrodes 22 in FIG. 1) and n sustain electrodes SU1 through SUn (sustain electrodes 23 in FIG. 1) long in the column direction are arranged, and m data electrodes D1 through Dm (data electrodes 32 in FIG. 1) long in the row direction are arranged. Each discharge cell is formed in the intersecting part of a pair of scan electrode SCi (i=1 through n) and sustain electrode SUi (i=1 through n) and one data electrode Dj (j=1 through m), the number of formed discharge cells in the discharge space is m×n.

Figure 3:
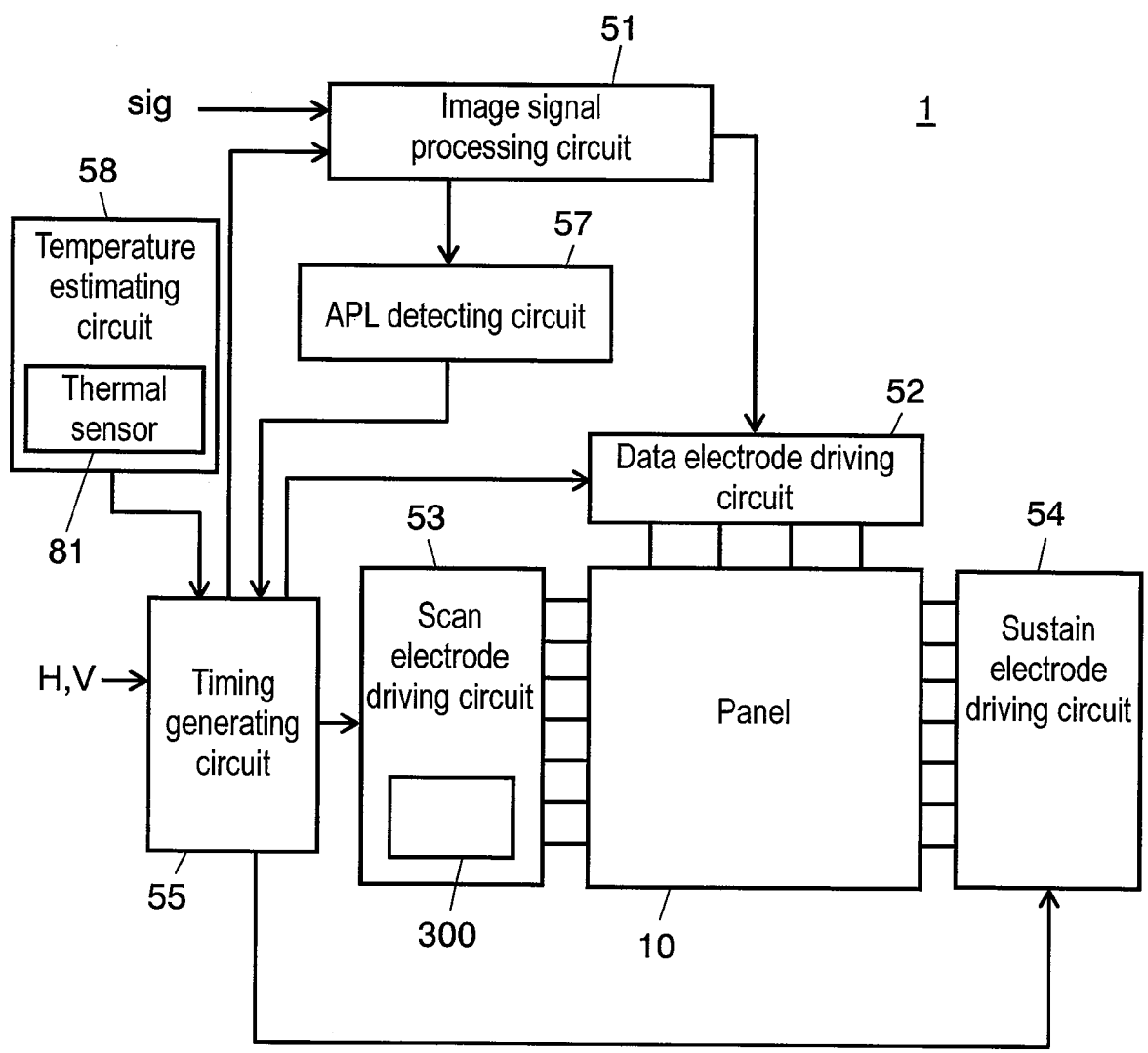
FIG. 3 is a circuit block diagram of a driving circuit for driving the panel.

FIG. 3 is a circuit block diagram of a driving circuit for driving panel 10 of exemplary embodiment 1 of the present invention. Plasma display device 1 has the following elements:
 panel 10;
 image signal processing circuit 51;
 data electrode driving circuit 52;
 scan electrode driving circuit 53;
 sustain electrode driving circuit 54;
 timing generating circuit 55;
 APL detecting circuit 57;
 temperature estimating circuit 58; and
 a power supply circuit (not shown) for supplying power required for each circuit block.

Image signal processing circuit 51 converts input image signal sig into image data that indicates emission or non-emission of light every subfield. Data electrode driving circuit 52 converts the image data every subfield into a signal corresponding to each of data electrodes D1 through Dm, and drives each of data electrodes D1 through Dm.

APL detecting circuit 57 detects the Average Picture Level (hereinafter referred to as "APL") of image signal sig. Specifically, the APL is detected using a generally-known method of accumulating the luminance values of image signal sig in one filed time period or one frame time period, for example.

Temperature estimating circuit 58 has thermal sensor 81 formed of a generally-known element such as a thermocouple used for detecting temperature. Temperature estimating circuit 58 calculates estimated values of the highest temperature and lowest temperature that panel 10 can have based on the temperature around panel 10 detected by thermal sensor 81 or the temperature in the casing in the present embodiment, and outputs the results to timing generating circuit 55. Hereinafter, these estimated values are referred to as "highest estimated temperature" and "lowest estimated temperature".

Timing generating circuit 55 generates various timing signals for controlling operation of each circuit block and supplies them to respective circuit blocks. This generation is performed based on horizontal synchronizing signal H, vertical synchronizing signal V, the APL detected by APL detecting circuit 57, and the highest estimated temperature and lowest estimated temperature estimated by temperature estimating circuit 58. Scan electrode driving circuit 53 has initializing waveform generating circuit 300 for generating an initializing voltage waveform to be applied to scan electrodes SC1 through SCn in the initializing period, and drives each of scan electrodes SC1 through SCn based on the timing signals. Sustain electrode driving circuit 54 drives sustain electrodes SU1 through SUn based on the timing signals.

Figure 4A:
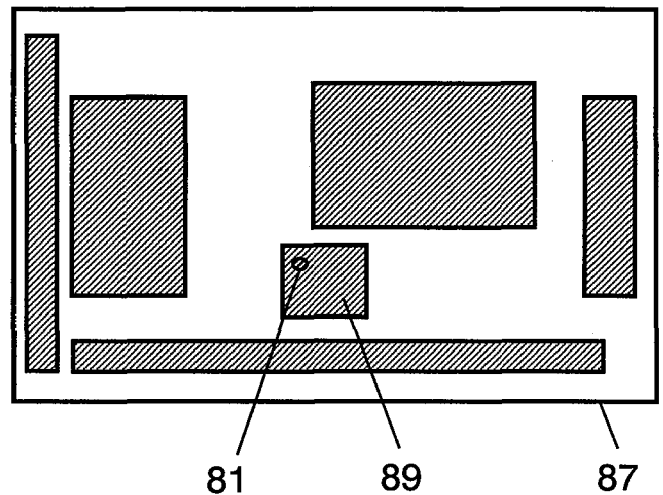
FIG. 4A shows an attaching position of a thermal sensor of a plasma display device in accordance with the first exemplary embodiment.
Figure 4B:
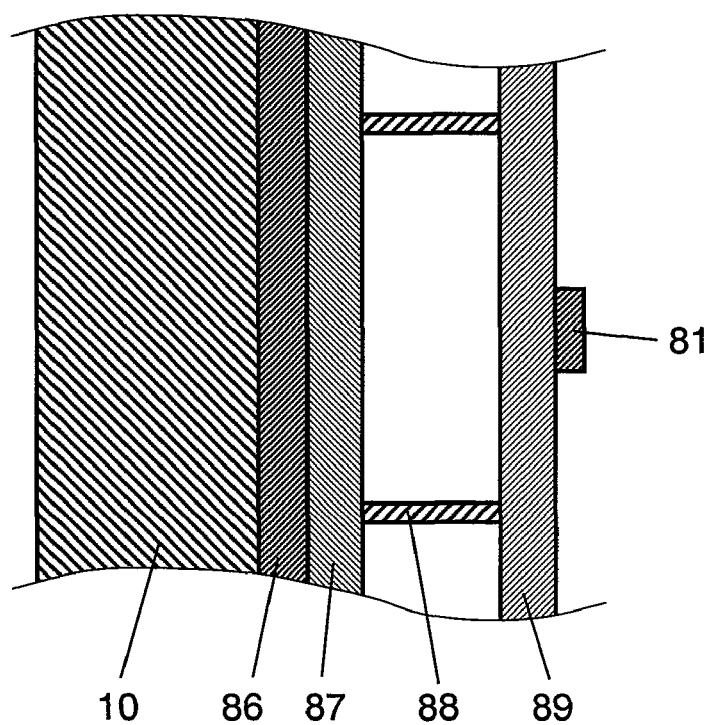
FIG. 4B shows the attaching position of the thermal sensor of the plasma display device in accordance with the first exemplary embodiment.

FIG. 4A and FIG. 4B show an attaching position of thermal sensor 81 of plasma display device 1 of exemplary embodiment 1 of the present invention. FIG. 4A is a rear view of plasma display device 1, and FIG. 4B is an enlarged sectional view of plasma display device 1. Heat-conduction sheet 86 is bonded to the rear surface of panel 10, and aluminum chassis 87 is bonded to heat-conduction sheet 86. Circuit board 89 having each driving circuit is attached to aluminum chassis 87 via boss material 88, and thermal sensor 81 is attached to the surface of circuit board 89 on the opposite side to panel 10. Therefore, panel 10 and thermal sensor 81 are separated by an air layer. Thermal sensor 81 is disposed at a position where it does not directly come into contact with panel 10, and does not directly thermally couple to panel 10.

In the present embodiment, thermal sensor 81 is disposed at a position where it directly comes into contact with none of panel 10, heat-conduction sheet 86, and aluminum chassis 87. Since the air layer formed of boss material 88 is sandwiched between panel 10 and thermal sensor 81, thermal sensor 81 is prevented from directly coming into contact with panel 10, and thermal sensor 81 is prevented from detecting local heat of panel 10. Thermal sensor 81 may be attached to another position as long as it does not directly thermally couple to panel 10.

Next, a driving voltage waveform and its operation for driving panel 10 are described. Plasma display device 1 performs gradation display by a subfield method. In this method, one field time period is divided into a plurality of subfields, and emission and non-emission of light of each display cell are controlled every subfield.

In the initializing period, initializing discharge is performed to form a wall charge required for a subsequent writing operation on each electrode. The initializing operation includes an all-cell initializing operation of causing initializing discharge in all discharge cells, and a selection initializing operation of causing initializing discharge in a discharge cell that has performed sustaining discharge.

In the writing time period, writing discharge is selectively caused in a discharge cell to emit light, thereby forming a wall charge. In the sustaining period, as many sustain pulses as the number proportional to luminance weight are alternately applied to display electrode pairs 28, sustaining discharge is caused in the discharge cell where the writing discharge has been caused. The proportionality constant is called luminance magnification. The detailed subfield structure is described later, and the driving voltage waveform and its operation in the subfield are described here.

Figure 5:
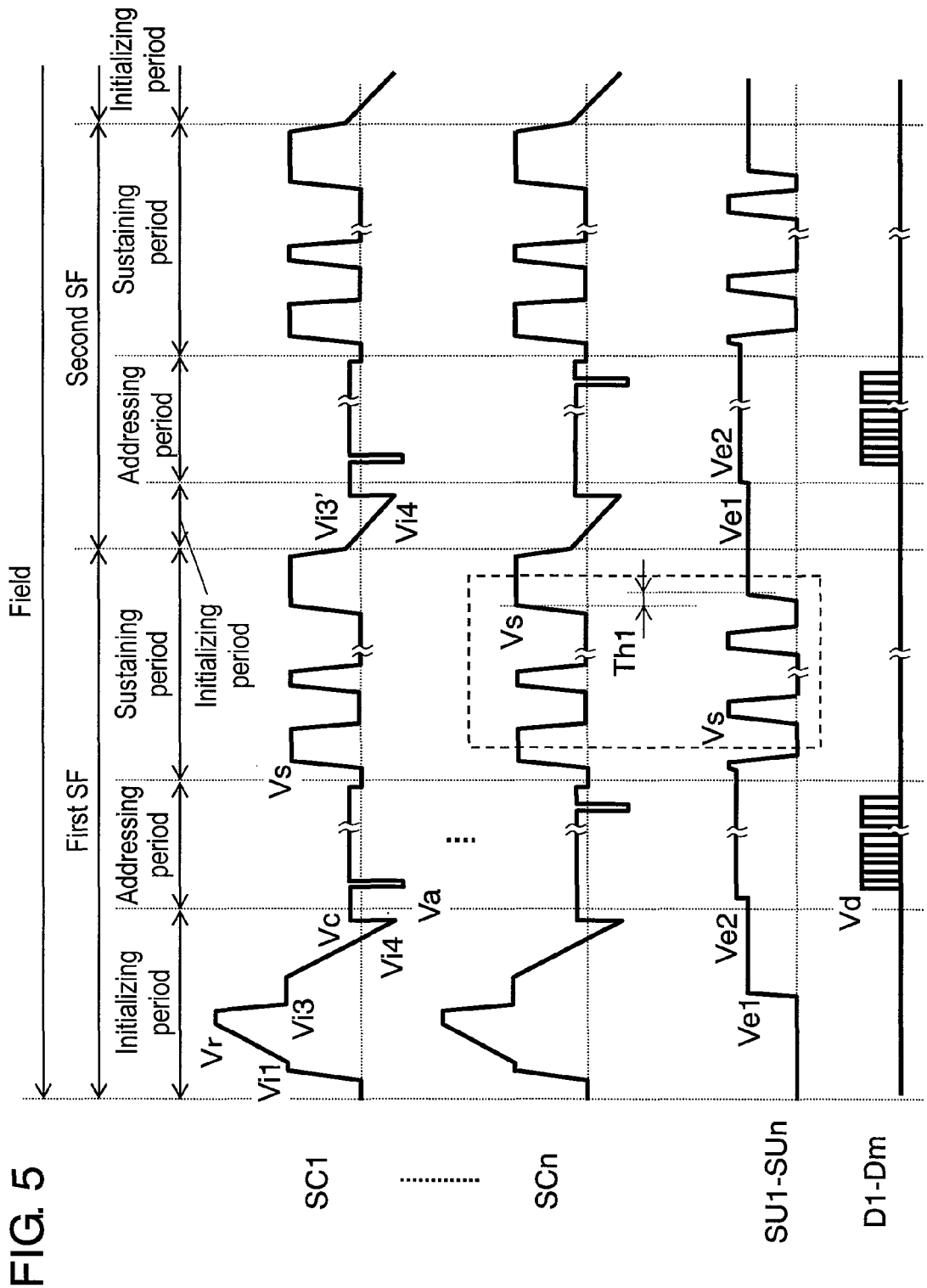
FIG. 5 is a waveform chart of driving voltage applied to each electrode of the panel.

FIG. 5 is a waveform chart of the driving voltage applied to each electrode of panel 10 of exemplary embodiment 1 of the present invention. FIG. 5 shows a subfield (first SF) where the all-cell initializing operation is performed, and a subfield (second SF) where the selection initializing operation is performed.

The subfield (first SF) where the all-cell initializing operation is performed is described first.

In the first half of the initializing period, 0 (V) is applied to data electrodes D1 through Dm and sustain electrodes SU1 through SUn, and a ramp waveform voltage is applied to scan electrodes SC1 through SCn. Here, the ramp waveform voltage gradually increases from voltage Vi1 that is not higher than a discharge start voltage to sustain electrodes SU1 through SUn to a voltage that is higher than the discharge start voltage. Hereinafter, the maximum of the voltage, which gradually increases, applied to scan electrodes SC1 through SCn in the first half of the initializing period is referred to as "initializing voltage Vr".

While the ramp waveform voltage increases, feeble initializing discharge occurs between scan electrodes SC1 through SCn and sustain electrodes SU1 through SUn, and feeble initializing discharge occurs between scan electrodes SC1 through SCn and data electrodes D1 through Dm. Negative wall voltage is accumulated on scan electrodes SC1 through SCn, and positive wall voltage is accumulated on data electrodes D1 through Dm and sustain electrodes SU1 through SUn. Here, the wall voltage on the electrodes means the voltage generated by the wall charges accumulated on dielectric layer 24 covering the electrodes, dielectric layer 33, protective layer 25, and phosphor layer 35.

In the initializing discharge at this time, excessive wall voltage is accumulated in order to optimize the wall voltage in the subsequent last half of the initializing period. The accumulated excessive wall voltage can be controlled by initializing voltage Vr. The value of initializing voltage Vr is not always constant but varies as necessary, though the detail is described later.

In the last half of the initializing period, positive voltage Ve1 is applied to sustain electrodes SU1 through SUn. A ramp waveform voltage (hereinafter referred to as "ramp voltage") is applied to scan electrodes SC1 through SCn. Here, the ramp voltage gradually decreases from voltage Vi3 that is not higher than the discharge start voltage to sustain electrodes SU1 through SUn to voltage Vi4 that is higher than the discharge start voltage. While the ramp waveform voltage decreases, feeble initializing discharge occurs between scan electrodes SC1 through SCn and sustain electrodes SU1 through SUn, and feeble initializing discharge occurs between scan electrodes SC1 through SCn and data electrodes D1 through Dm. The negative wall voltage on scan electrodes SC1 through SCn and the positive wall voltage on sustain electrodes SU1 through SUn are reduced, positive wall voltage on data electrodes D1 through Dm is adjusted to a value suitable for the writing operation. Thus, the all-cell initializing operation of applying initializing discharge to all discharge cells is completed.

The discharge at this time depends on the excessive wall voltage accumulated in the first half of the initializing period. When initializing voltage Vr is low and the initializing discharge in the first half of the initializing period is weak, the initializing discharge in the last half of the initializing period becomes weak. When initializing voltage Vr is high, both initializing discharges become strong.

In the subsequent writing time period, voltage Ve2 is applied to sustain electrodes SU1 through SUn, and voltage Vc is applied to scan electrodes SC1 through SCn.

Next, negative scan pulse voltage Va is applied to scan electrode SC1 in the first column, positive writing pulse voltage Vd is applied to data electrode Dk (k is integer 1 through m), of data electrodes D1 through Dm, in the discharge cell to emit light in the first column. The potential difference in the intersecting part of data electrode Dk and scan electrode SC1 is derived by adding the difference between the wall voltage on data electrode Dk and that on scan electrode SC1 to the difference (Vd−Va) of the external applied voltage, and exceeds the discharge start voltage. Writing discharge occurs between data electrode Dk and scan electrode SC1 and between sustain electrode SU1 and scan electrode SC1. Positive wall voltage is accumulated on scan electrode SC1, negative wall voltage is accumulated on sustain electrode SU1, and negative wall voltage is also accumulated on data electrode Dk.

Thus, a writing operation of causing writing discharge in the discharge cell to emit light in the first column and accumulating wall voltage on each electrode is performed. The voltage in the intersecting parts of scan electrode SC1 and data electrodes D1 through Dm to which writing pulse voltage Vd is not applied does not exceed the discharge start voltage, so that writing discharge does not occur. This writing operation is repeated until it reaches the discharge cell in the n-th column of scan electrode SCn, and the writing operation is completed.

In the subsequent sustaining period, firstly positive sustain pulse voltage Vs is applied to scan electrodes SC1 through SCn, and 0 (V) is applied to sustain electrodes SU1 through SUn. In the discharge cell where the writing discharge has been caused, the potential difference between scan electrode SCi and sustain electrode SUi is obtained by adding the difference between the wall voltage on scan electrode SCi and that on sustain electrode SUi to pulse voltage Vs, and exceeds the discharge start voltage.

Sustaining discharge occurs between scan electrode SCi and sustain electrode SUi, and ultraviolet rays occurring at this time causes phosphor layer 35 to emit light. Negative wall voltage is accumulated on scan electrode SCi, positive wall voltage is accumulated on sustain electrode SUi, and positive wall voltage is also accumulated on data electrode Dk. In the discharge cell where writing discharge has not occurred in the writing time period, sustaining discharge does not occur and the wall voltage at the completion of the initializing period is kept.

Subsequently, 0 (V) is applied to scan electrodes SC1 through SCn, and sustain pulse voltage Vs is applied to sustain electrodes SU1 through SUn. In the discharge cell where the sustaining discharge has been caused, the potential difference between sustain electrode SUi and scan electrode SCi exceeds the discharge start voltage. Therefore, sustaining discharge occurs between sustain electrode SUi and scan electrode SCi again, negative wall voltage is accumulated on sustain electrode SUi, and positive wall voltage is accumulated on scan electrode SCi. Hereinafter, similarly, as many sustain pulses as the number derived by multiplying the luminance weight by luminance magnification are alternately applied to scan electrodes SC1 through SCn and sustain electrodes SU1 through SUn to cause potential difference between the electrodes of display electrode pairs 28, thereby continuing sustaining discharge in the discharge cell that has caused the writing discharge in the writing time period.

At the end of the sustaining period, voltage Ve1 is applied to sustain electrodes SU1 through SUn after predetermined time Th1 after voltage Vs is applied to scan electrodes SC1 through SCn, thereby causing so called narrow pulse-like potential difference between scan electrodes SC1 through SCn and sustain electrodes SU1 through SUn. Thus, in the state where positive wall voltage is left on data electrode Dk, a part or the whole of wall voltage on scan electrode SCi and sustain electrode SUi is eliminated.

Next, the operation (second SF) of the subfield where the selection initializing operation is performed is described.

In the initializing period where selection initializing operation is performed, voltage Ve1 is applied to sustain electrodes SU1 through SUn, 0 (V) is applied to data electrodes D1 through Dm, and a ramp voltage is applied to scan electrodes SC1 through SCn. Here, the ramp voltage gradually decreases from voltage Vi3' to voltage Vi4.

In the discharge cell that has caused the sustaining discharge in the sustaining period of the last subfield, feeble initializing discharge occurs, and the wall voltage on scan electrode SCi and sustain electrode SUi is reduced. Regarding data electrode Dk, sufficient positive wall voltage is accumulated on data electrode Dk by the last sustaining discharge, so that the excessive part of the wall voltage is discharged to adjust the wall voltage to be appropriate for the writing operation.

While, in the discharge cell that has not caused the sustaining discharge in the last subfield, discharge is not performed and the wall voltage at the completion of the initializing period of the last subfield is kept. In the selection initializing operation, initializing discharge is selectively performed in the discharge cell where sustaining operation is performed in the sustaining period of the last subfield, The operation of the subsequent writing time period is similar to the operation of the writing time period of the subfield where the all-cell initializing operation is performed, and hence is not described. The operation of the subsequent sustaining period is similar except for the number of sustain pulses.

Next, the subfield structure of the driving method of panel 10 of the present embodiment is described. In the present embodiment, one field is divided into 10 subfields (first SF, second SF, . . . , 10th SF), and respective subfields are assumed to have luminance weights of 1, 2, 3, 6, 11, 18, 30, 44, 60 and 80. However, the number of subfields and the luminance weight of the subfields are not limited to the above-mentioned values.

In the present embodiment, the subfield structure except the number of subfields and the luminance weights is changed based on the APL of the image signal. The subfield structure is further changed based on the temperature in the casing detected by thermal sensor 81. Hereinafter, the subfield structure based on the temperature is referred to as "driving mode".

Figure 6A:
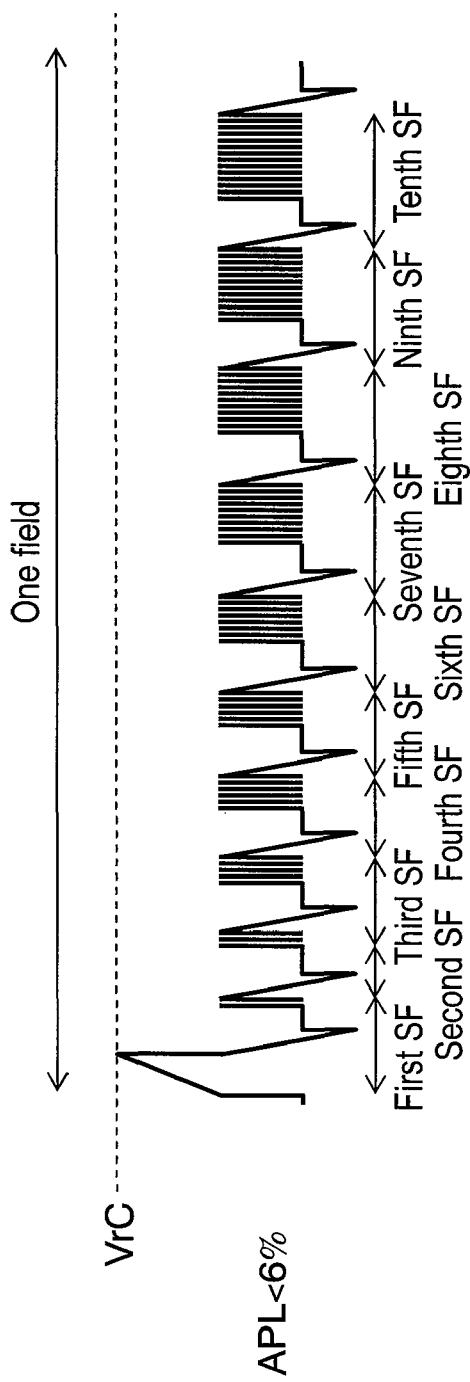
FIG. 6A shows a subfield structure in accordance with the first exemplary embodiment.
Figure 6B:
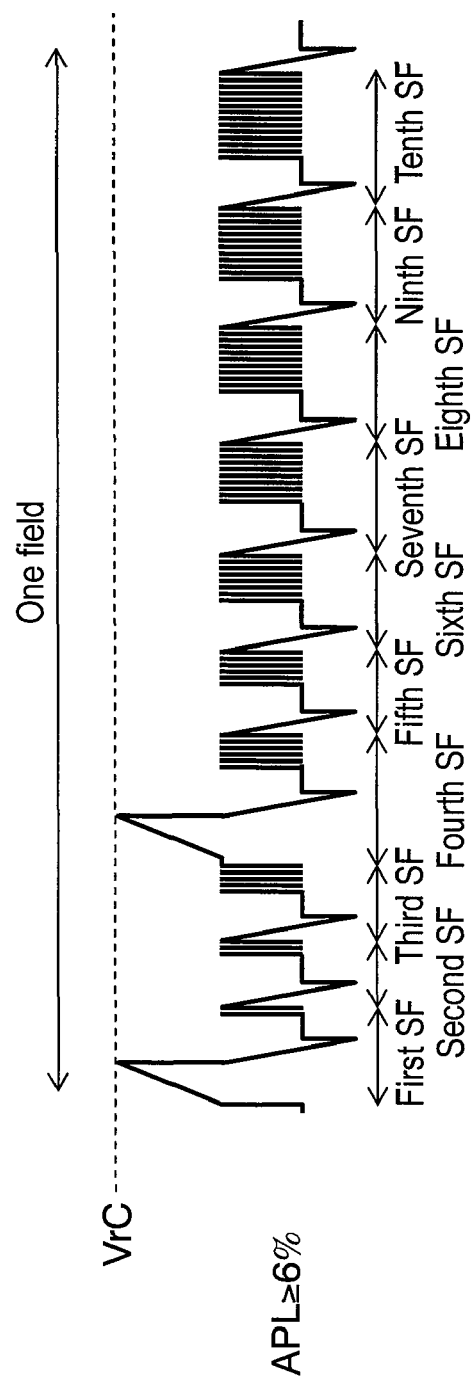
FIG. 6B shows another subfield structure in accordance with the first exemplary embodiment.

First, the relationship between the APL and the subfield structure is described. FIG. 6A and FIG. 6B show subfield structures of exemplary embodiment 1 of the present invention. Each subfield is either of a subfield (hereinafter referred to as "all-cell initializing subfield") where all-cell initializing operation is performed in the initializing period and a subfield (hereinafter referred to as "selection initializing subfield") where selection initializing operation is performed in the initializing period. FIG. 6A, FIG. 6B, FIG. 7A, FIG. 7B, and FIG. 7C show short summaries of one field of driving waveforms of panel 10, and the detailed waveform in each time period of each subfield is shown in FIG. 5.

In the present embodiment, the subfield structure is changed based on the APL of the image signal to be displayed. FIG. 6A shows the structure used when the APL of the image signal is lower than 6%. Only the first SF is an all-cell initializing subfield, and the second SF through 10th SF are selection initializing subfields. FIG. 6B shows the structure used when the APL of the image signal is 6% or higher. The first SF and fourth SF are all-cell initializing subfields, and the second SF, third SF, and fifth SF through 10th SF are selection initializing subfields. In other words, the number of all-cell initializations is one when the APL is lower than threshold 6%, and the number of all-cell initializations is two when the APL is threshold 6% or higher. The number of all-cell initializing subfields can be increased or decreased. Table 1 shows the relationship between the subfield structure and the APL.

TABLE 1

| APL | Number of all-cell initializations | All-cell initializing SF |
|---|---|---|
| lower than 6% | 1 | 1 |
| 6% or higher | 2 | 1, 4 |

In the present embodiment, the number of all-cell initializing subfields can be increased when the APL increases; however, a similar advantage is obtained even when the initializing voltage is increased.

A generally used driving mode (normal-temperature driving mode) has been described; however, the present embodiment has a low-temperature driving mode and a high-temperature driving mode in addition to the normal-temperature driving mode.

Figure 7A:
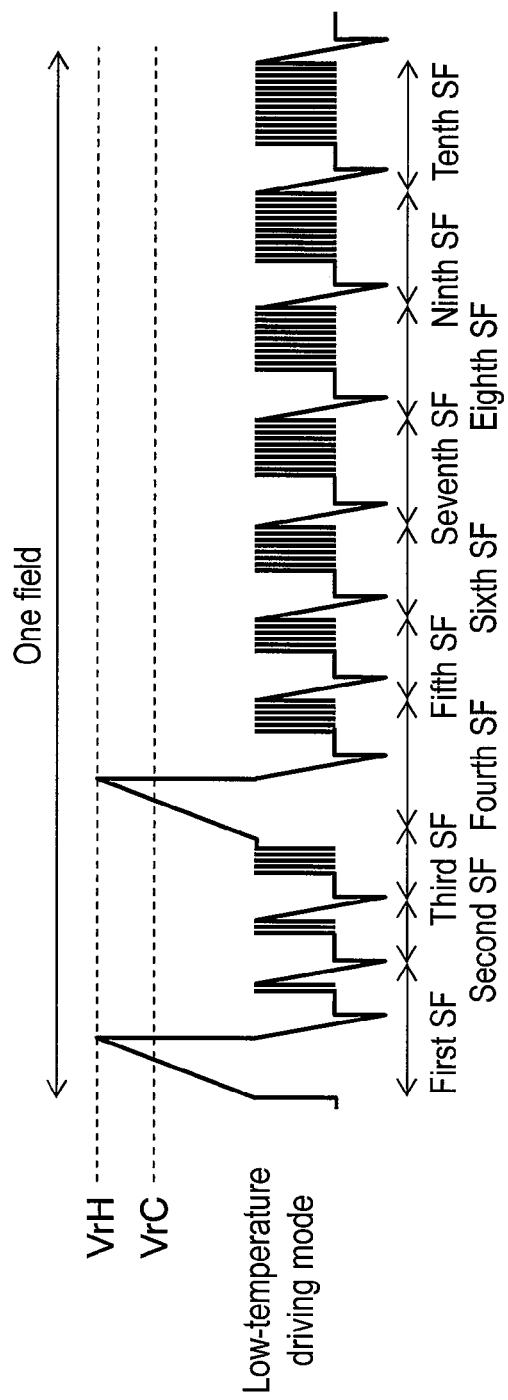
FIG. 7A shows yet another subfield structure in accordance with the first exemplary embodiment.
Figure 7B:
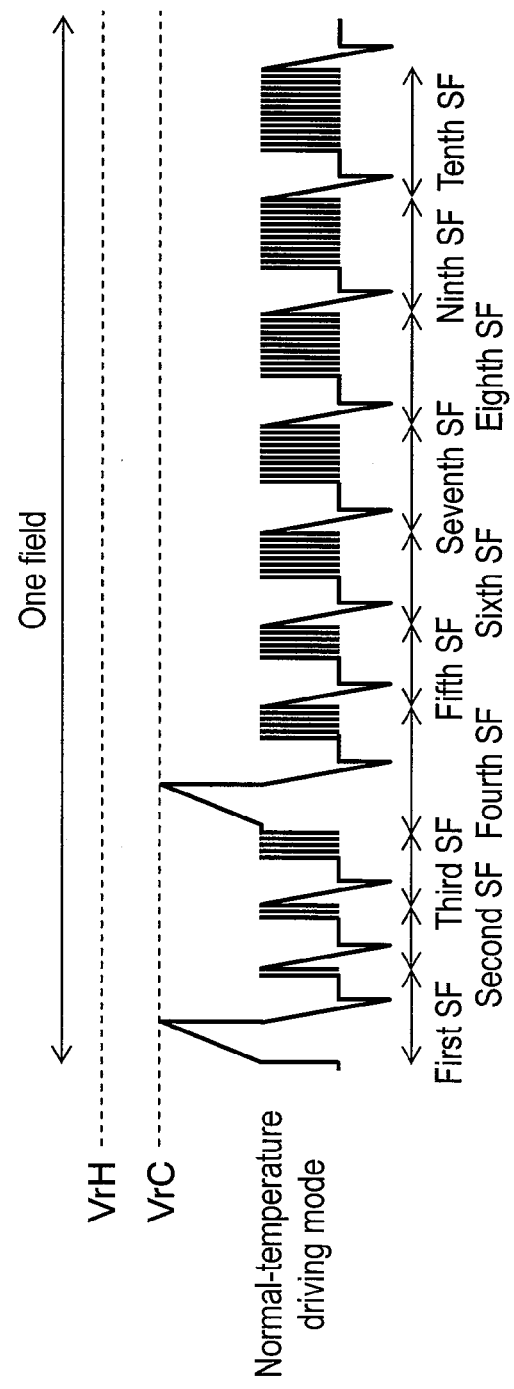
FIG. 7B shows still another subfield structure in accordance with the first exemplary embodiment.
Figure 7C:
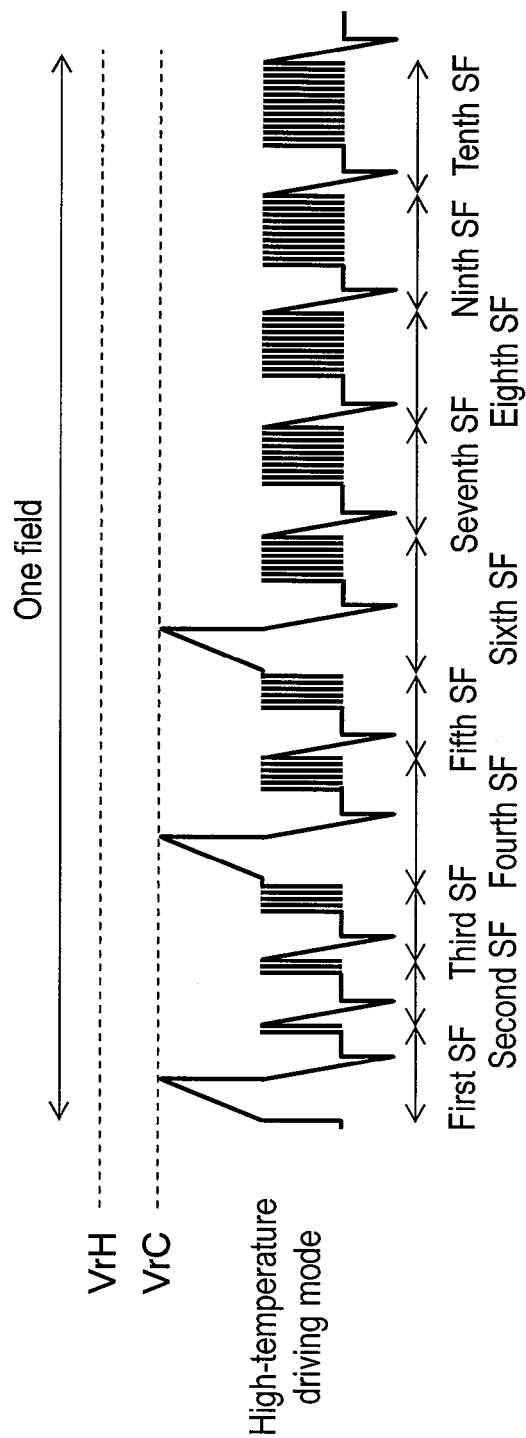
FIG. 7C shows still another subfield structure in accordance with the first exemplary embodiment.

FIG. 7A, FIG. 7B, and FIG. 7C show subfield structures of exemplary embodiment 1 of the present invention. The subfield structures correspond to three driving modes when the APL of the image signal is 6% or higher, for example.

FIG. 7A shows one example of the low-temperature driving mode. In the low-temperature driving mode, stable image display is allowed even when the temperature of the panel 10 is low. For example, this driving mode is used just after the power is turned on and before the temperature of the panel 10 increases in a state where plasma display device 1 is installed in a low-temperature environment.

In the low-temperature driving mode of the present embodiment, the all-cell initializing operation is performed in the first SF and fourth SF, and the selection initializing operation is performed in the other subfields. Initializing voltage Vr at this time is set at voltage VrH higher than initializing voltage VrC of the normal-temperature driving mode and the after-mentioned high-temperature driving mode.

FIG. 7B shows the normal-temperature driving mode. The normal-temperature driving mode is generally used. In the present embodiment, the all-cell initializing operation is performed in the first SF and fourth SF, and the selection initializing operation is performed in the other subfields. Initializing voltage Vr at this time is set at voltage VrC lower than initializing voltage VrH of the low-temperature driving mode.

FIG. 7C shows one example of the high-temperature driving mode. In the high-temperature driving mode, stable image display is allowed even when the temperature of the panel 10 is high. For example, this driving mode is used when plasma display device 1 is installed in a high-temperature environment or when the temperature of panel 10 becomes high.

In the high-temperature driving mode of the present embodiment, the all-cell initializing operation is performed in the first SF, fourth SF, and sixth SF, and the selection initializing operation is performed in the other subfields. Initializing voltage Vr at this time is set at voltage VrC that is the same as that of normal-temperature driving mode. In the high-temperature driving mode, the number of all-cell initializing operations is set larger than those in the low-temperature driving mode and normal-temperature driving mode. Thus, the initializing voltage for causing the initializing discharge can be varied in the all-cell initializing subfield.

Next, a reason why three driving modes of the low-temperature driving mode, normal-temperature driving mode, and high-temperature driving mode are used by switching is described.

When the temperature of panel 10 becomes low, the discharge start voltage increases and hence the initializing discharge in the all-cell initializing operation is apt to become unstable. When the initializing discharge becomes unstable, a false discharge phenomenon can occur. For example, the false discharge phenomenon is light emission by a discharge cell that must not emit light. This false discharge can be reduced by increasing initializing voltage Vr in the all-cell initializing subfield.

Therefore, in the present embodiment, initializing voltage Vr in the all-cell initializing operation in the low-temperature driving mode is set at voltage VrH higher than initializing voltage VrC of the normal-temperature driving mode. As a result, even when the temperature of panel 10 is low, stable all-cell initializing operation and stable image display are performed.

When the temperature of panel 10 becomes high, a writing failure can occur. For example, while writing discharge is performed in the discharge cell of some scan electrode in the writing time period, the wall charge of the discharge cell of a non-selected scan electrode is lost. Therefore, when the writing discharge is intended to occur, the wall voltage runs short and writing discharge does not occur.

In the present embodiment, the shortage of wall charge is covered and a writing failure is prevented, by increasing the number of all-cell initializing operations in the high-temperature driving mode. Thus, even when the temperature of panel 10 becomes high, stable image display is allowed.

When the temperature of panel 10 becomes high or low, a discharge failure such as false discharge or wiring failure can occur, and display quality can be reduced by the discharge failure. In the present embodiment, for reducing the discharge failure, three driving modes of the normal-temperature driving mode, high-temperature driving mode, and low-temperature driving mode are used by switching by timing generating circuit 55.

Next, the method for switching among driving modes is described. The temperature of panel 10 surely depends on the ambient temperature at which plasma display device 1 is disposed, and is complicatedly varied by heat generated by a circuit for driving panel 10, heat generated by panel 10 itself, or an image signal for controlling these heats. Therefore, the temperature of panel 10 is difficult to be accurately detected all over panel 10. For detecting the temperature of panel 10 without being affected by the constantly varying display image, many thermal sensors 81 are required to be disposed in respective parts of panel 10. This is not practical.

In the present embodiment, the temperature of panel 10 is not directly detected. It is estimated whether a region requiring the driving in the low-temperature driving mode can occur or a region requiring the driving in the high-temperature driving mode can occur in the display screen of panel 10, the driving mode is switched based on the estimated result, and image display is performed while the discharge failure is suppressed.

Figure 8A:
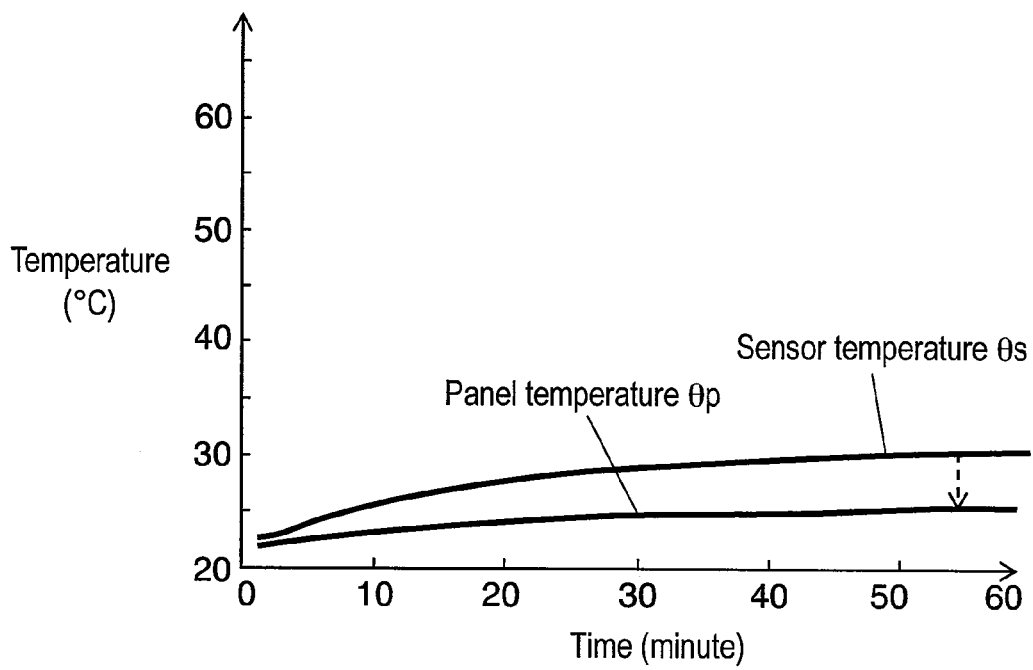
FIG. 8A shows a measured result of the relationship between the temperature in a casing and the temperature of the panel detected by a thermal sensor in accordance with the first exemplary embodiment.
Figure 8B:
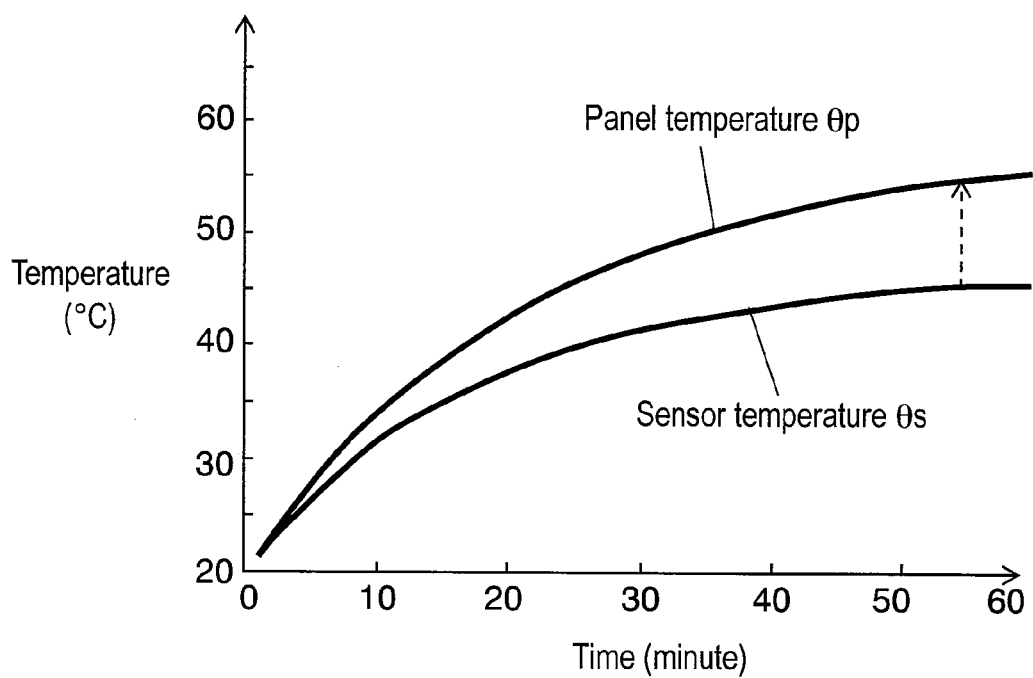
FIG. 8B shows another measured result of the relationship between the temperature in the casing and the temperature of the panel detected by the thermal sensor in accordance with the first exemplary embodiment.

FIG. 8A and FIG. 8B show measured results of the relationship between the temperature (hereinafter referred to as "sensor temperature") $\theta s$ in the casing detected by thermal sensor 81 of embodiment 1 and the temperature (hereinafter referred to as "panel temperature") $\theta p$ of panel 10. The vertical axis shows temperature, and horizontal axis shows time. For this measurement, thermal sensor 81 is disposed on the circuit board so that sensor temperature $\theta s$ is prevented from being affected by local temperature of panel 10 and it does not bond to panel 10.

For estimating a possible lowest temperature of panel 10, an image capable of minimizing the temperature of panel 10, namely an all-cell non-luminescent pattern, is displayed, the temperature in the lowest-temperature region of panel 10 is measured, and the difference between it and sensor temperature $\theta s$ is investigated.

FIG. 8A shows panel temperature $\theta p$ and sensor temperature $\theta s$ when the all-cell non-luminescent pattern is displayed. After turning on plasma display device 1, sensor temperature $\theta s$ gradually increases. Panel temperature $\theta p$ further gradually increases, because discharge hardly occurs in panel 10 and panel 10 hardly generates heat by itself. In the present embodiment, the difference between sensor temperature $\theta s$ and panel temperature $\theta p$ becomes substantially constant after 10-20 minutes, panel temperature $\theta p$ at this time is found to be lower than sensor temperature $\theta s$ by about 7° C. In the present embodiment, low-temperature correction value $\Delta\theta L$ is set at 7° C., and the temperature obtained by subtracting low-temperature correction value $\Delta\theta L$ from sensor temperature $\theta s$ is used as lowest estimated temperature $\theta L$.

For estimating a possible highest temperature of panel 10, an image capable of maximizing the temperature of panel 10, namely an all-cell luminescent pattern, is displayed, the temperature in the highest-temperature region of panel 10 is measured, and the difference between it and sensor temperature $\theta s$ is investigated.

FIG. 8B shows panel temperature $\theta p$ and sensor temperature $\theta s$ when the all-cell luminescent pattern is displayed. After turning on plasma display device 1, sensor temperature $\theta s$ sharply increases. Panel temperature $\theta p$ further sharply increases, because power consumption of the driving circuit is large and panel 10 generates heat by itself. In the present embodiment, the difference between sensor temperature $\theta s$ and panel temperature $\theta p$ becomes substantially constant after 10-20 minutes, panel temperature $\theta p$ at this time is found to be higher than sensor temperature $\theta s$ by about 10° C. In the present embodiment, high-temperature correction value $\Delta\theta H$ is set at 10° C., and the temperature obtained by adding high-temperature correction value $\Delta\theta H$ to the sensor temperature is used as highest estimated temperature $\theta H$.

In the present embodiment, lowest estimated temperature $\theta L$ and highest estimated temperature $\theta H$ are determined using the following expressions:

$$\theta L(t) = \theta s(t) - \Delta\theta Lo; \text{ and}$$

$$\theta H(t) = \theta s(t) + \Delta\theta Ho.$$

Where, $\theta s(t)$, $\theta L(t)$, and $\theta H(t)$ are sensor temperature $\theta s$, lowest estimated temperature $\theta L$, and highest estimated temperature $\theta H$ that are functions of time t. $\Delta\theta Lo$ and $\Delta\theta Ho$ are low-temperature correction value $\Delta\theta L$ and high-temperature correction value $\Delta\theta H$, and are 7° C. and 10° C. in the present embodiment, respectively.

Figure 9:
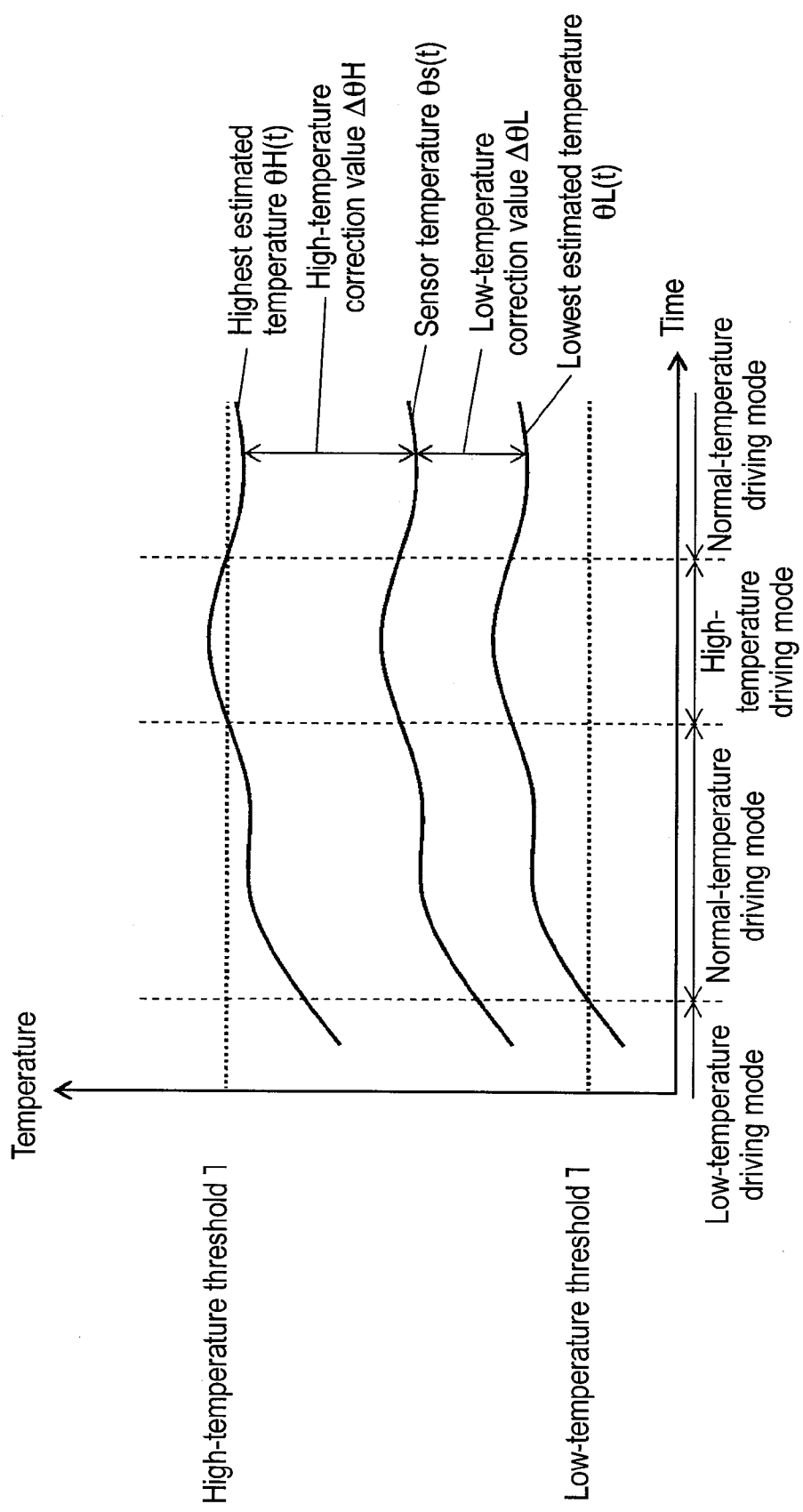
FIG. 9 is a schematic diagram showing the relationship of the lowest estimated temperature and highest estimated temperature with the low-temperature threshold and high-temperature threshold in accordance with the first exemplary embodiment.

FIG. 9 is a schematic diagram showing the relationship of lowest estimated temperature θL(t) and highest estimated temperature θH(t) with low-temperature threshold ThL and high-temperature threshold ThH of exemplary embodiment 1 of the present invention. In FIG. 9, when lowest estimated temperature θL(t) is lower than previously set low-temperature threshold ThL, panel 10 is driven in low-temperature driving mode. When highest estimated temperature θH(t) is preset high-temperature threshold ThH or higher, panel 10 is driven in high-temperature driving mode. In the other cases, panel 10 is driven in normal-temperature driving mode.

Thus, the subfield structure is switched based on the APL of the image and the driving mode is switched based on sensor temperature θs in the present embodiment. It is therefore considered that the black display region has zero or slight area when an image having high APL is displayed, so that the writing discharge is stabilized by increasing the number of all-cell initializations and the priming. While, it is considered that the black image display region is large when an image having low APL is displayed, so that an image with sharp contrast is displayed by decreasing the number of all-cell initializations and suppressing black luminance.

Since the driving mode is switched based on sensor temperature θs, the initializing discharge is stabilized by setting initializing voltage Vr to be high even when the temperature of panel 10 is low, and the subfield structure can be switched based on the APL. The number of all-cell initializations is increased and a writing failure is prevented even when the temperature of panel 10 is high, and the subfield structure can be switched based on the APL.

Next, a method for controlling initializing voltage Vr in the all-cell initializing operation is described. For varying initializing voltage Vr, the following various methods are considered:

voltage Vi1 of scan electrode SC1 of FIG. 5 is increased; or
voltage Vi2 is increased by sharpening the gradient of increase from voltage Vi1 to voltage Vi2.

One example of the control method is described hereinafter with reference to a drawing.

Figure 10:
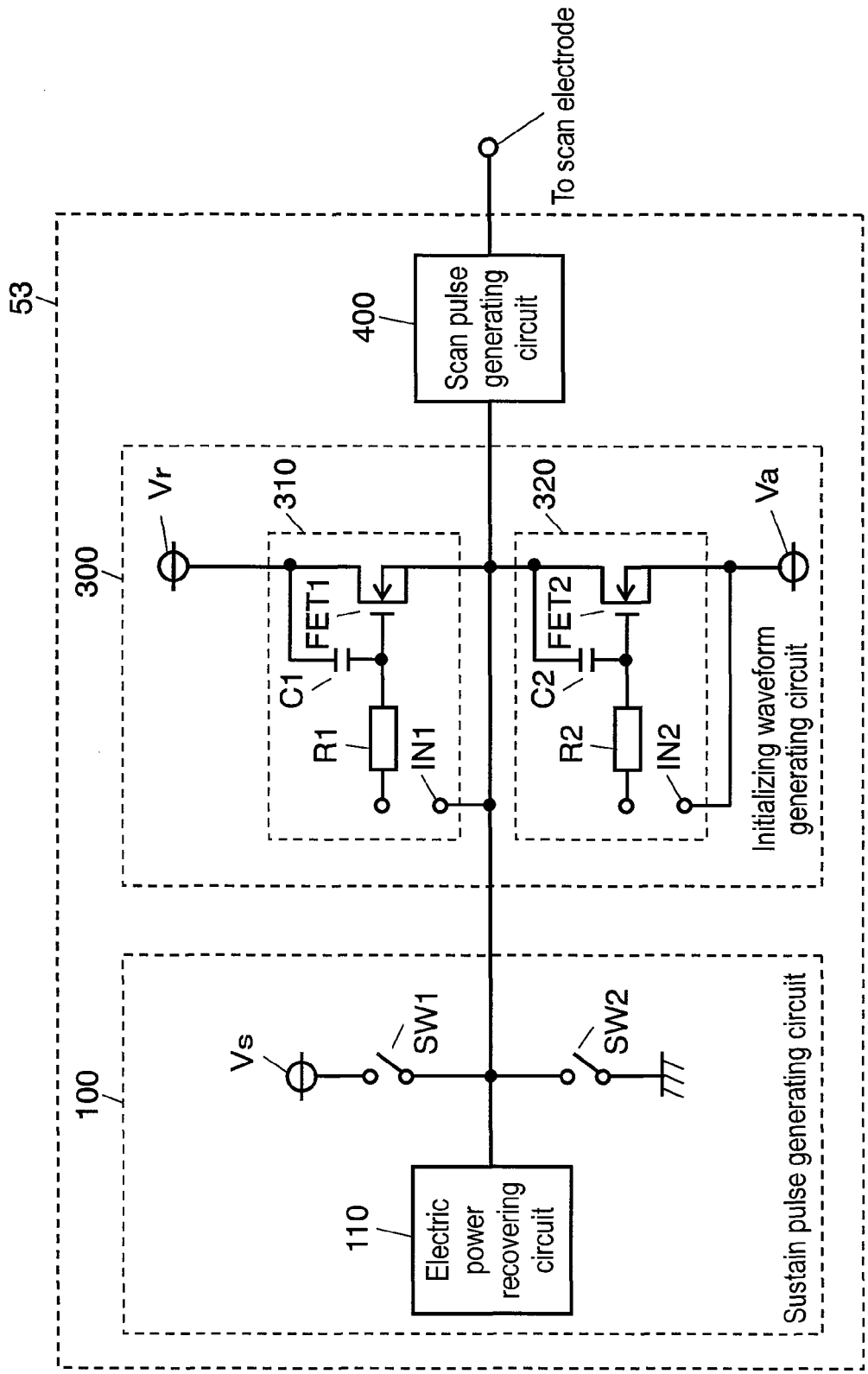
FIG. 10 is a circuit diagram of a scan electrode driving circuit in accordance with the first exemplary embodiment.

FIG. 10 is a circuit diagram of scan electrode driving circuit 53 of exemplary embodiment 1 of the present invention. Scan electrode driving circuit 53 has the following elements:

sustain pulse generating circuit 100 for generating a sustain pulse;
initializing waveform generating circuit 300 for generating an initializing waveform; and
scan pulse generating circuit 400 for generating a scan pulse.

Sustain pulse generating circuit 100 has the following elements:

electric power recovering circuit 110 for recovering and reusing electric power in driving scan electrodes 22;
switching element SW1 for clamping scan electrodes 22 on voltage Vs; and
switching element SW2 for clamping scan electrodes 22 on 0 (V).

Scan pulse generating circuit 400 sequentially applies a scan pulse to scan electrodes 22 in the writing time period. Scan pulse generating circuit 400 outputs the voltage waveform of sustain pulse generating circuit 100 or initializing waveform generating circuit 300 as it is in the initializing period and in the sustaining period.

Initializing waveform generating circuit 300 has Miller integrating circuit 310 and Miller integrating circuit 320. Initializing waveform generating circuit 300 generates an initializing waveform and controls initializing voltage Vr in the all-cell initializing operation. Miller integrating circuit 310 has Field Effect Transistor (FET) 1, capacitor C1, and resistor R1, and generates a ramp waveform voltage that gradually increases like a ramp to predetermined initializing voltage Vr. Miller integrating circuit 320 has FET 2, capacitor C2, and resistor R2, and generates a ramp waveform voltage that decreases gradually like a ramp to voltage Vi4. In FIG. 10, respective input terminals of Miller integrating circuit 310 and Miller integrating circuit 320 are shown as terminal IN1 and terminal IN2.

In the present embodiment, the Miller integrating circuit having a practical FET with a relatively simple structure is employed as initializing waveform generating circuit 300, but the present invention is not limited to this. Any circuit capable of generating a ramp waveform voltage while controlling initializing voltage Vr may be used.

Figure 11:
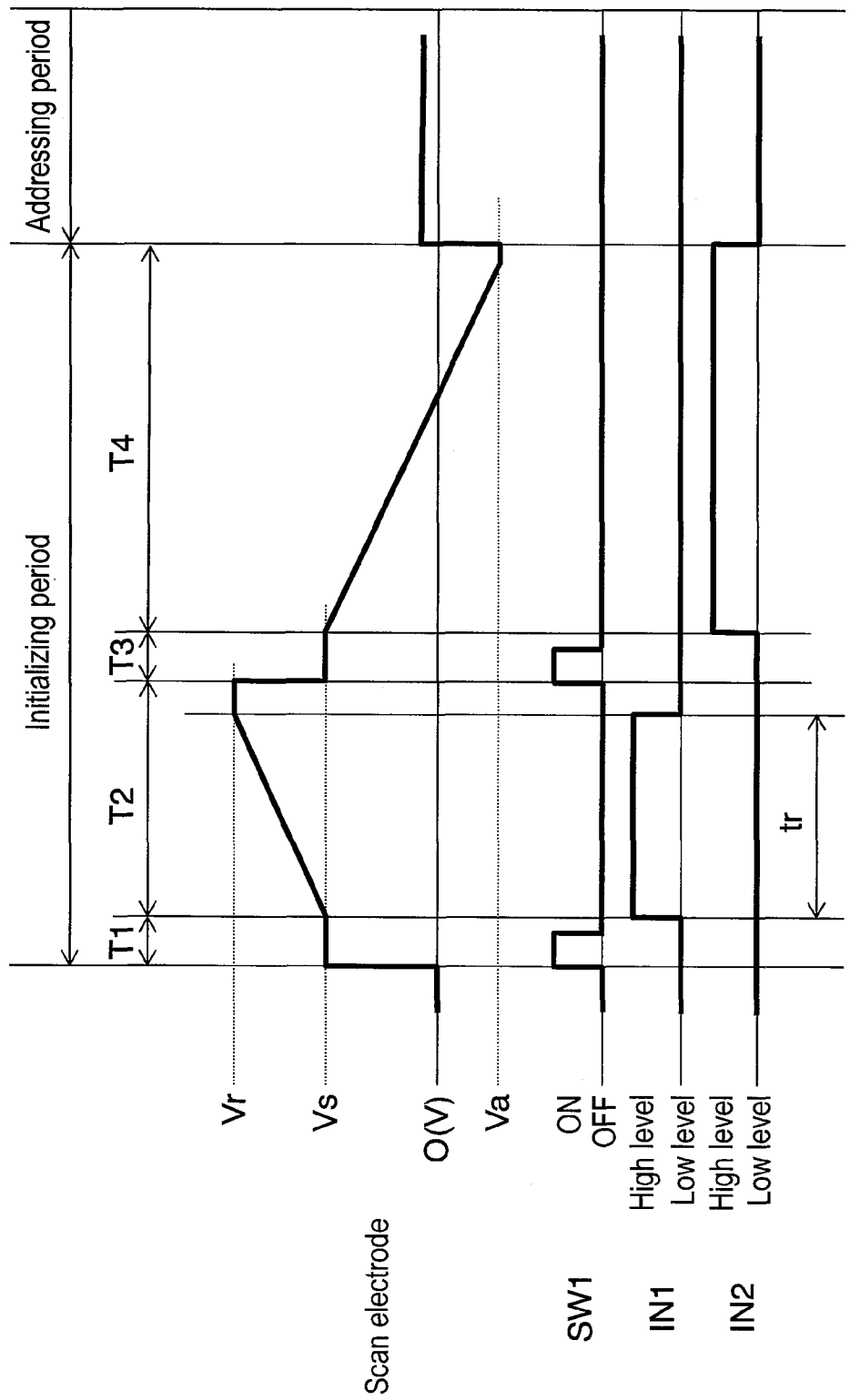
FIG. 11 is a timing chart illustrating operation of the scan electrode driving circuit in an all-cell initializing period in accordance with the first exemplary embodiment.

Next, an operation of initializing waveform generating circuit 300 is described. FIG. 11 is a timing chart for illustrating an operation of scan electrode driving circuit 53 in the all-cell initializing period in accordance with exemplary embodiment 1 of the present invention. The driving voltage waveform for the all-cell initializing operation is divided into four time periods T1 through T4, and each time period is described.

The description is performed assuming that both voltage Vi1 and voltage Vi3 are equal to voltage Vs. The operation of conducting a switching element is denoted as ON, and the operation of breaking it is denoted as OFF in the following description.

(Time Period T1)

Switching element SW1 of sustain pulse generating circuit 100 is firstly set at ON. At this time, voltage Vs is applied to scan electrodes 22 via switching element SW1. Then, switching element SW1 is set at OFF.

(Time Period T2)

Next, input terminal IN1 of Miller integrating circuit 310 is set at "high level". Specifically, voltage 15 (V), for example, is applied to input terminal IN1. At this time, constant current flows from resistor R1 toward capacitor C1, the source voltage of FET 1 increases like a ramp, and the output voltage of scan electrode driving circuit 53 also increases like a ramp. The voltage increase is continued while input terminal IN1 is kept at "high level".

After the output voltage increases to required initializing voltage Vr, input terminal IN1 is set at "low level".

Thus, a ramp voltage is applied to scan electrodes 22 which gradually increases from voltage Vs that is not higher than the discharge start voltage to initializing voltage Vr that is higher than the discharge start voltage. Here, voltage Vs is equal to voltage Vi1 and voltage Vi3 in the present embodiment.

When time tr during which input terminal IN1 is kept at "high level" is extended, initializing voltage Vr can be increased. When the time tr is shortened, initializing voltage Vr can be decreased.

(Time period T3)

Next, switching element SW1 of sustain pulse generating circuit 100 is set at ON. At this time, the voltage of scan electrodes 22 decreases to voltage Vs. Then, switching element SW1 is set at OFF.

(Time period T4)

Next, input terminal IN2 of Miller integrating circuit 320 is set at "high level". Specifically, voltage 15 (V), for example, is applied to input terminal IN2. At this time, constant current flows from resistor R2 toward capacitor C2, the drain voltage of FET 2 decreases like a ramp, and the output voltage of scan electrode driving circuit 53 also starts to decrease like a ramp. After the output voltage reaches negative voltage Vi4, input terminal IN2 is set at "low level".

Thus, a ramp voltage is applied to scan electrodes 22 which gradually increases from voltage Vi1 that is not higher than the discharge start voltage to initializing voltage Vr that is higher than the discharge start voltage. After that, a ramp voltage which gradually decreases from voltage Vi3 to voltage Vi4 is applied to scan electrodes 22.

In FIG. 11, initializing voltage VrH can be applied by extending time tr during which input terminal IN1 of scan electrode driving circuit 53 of FIG. 10 is kept at "high level", and initializing voltage VrC can be applied by shortening time tr.

Second Exemplary Embodiment

An exemplary embodiment is described hereinafter which can perform the above-mentioned control on an optimal condition from the initial stage of use of plasma display device 1 regardless of accumulated use time, in consideration of the phenomenon where extending the accumulated use time of panel 10 varies the discharge characteristics.

Short summary or the like of the structure and driving voltage waveform of panel 10 of the present embodiment is similar to that of embodiment 1. Embodiment 2 is different from embodiment 1 in the following points:

the panel of embodiment 2 has an accumulated time measuring circuit for measuring the sum (hereinafter referred to as "power-on accumulated time") of time during which plasma display device 1 is powered; and at least one of the number of all-cell initializations and initializing voltage is controlled based on the APL of an image signal, sensor temperature θs, and the power-on accumulated time of panel 10.

Figure 12:
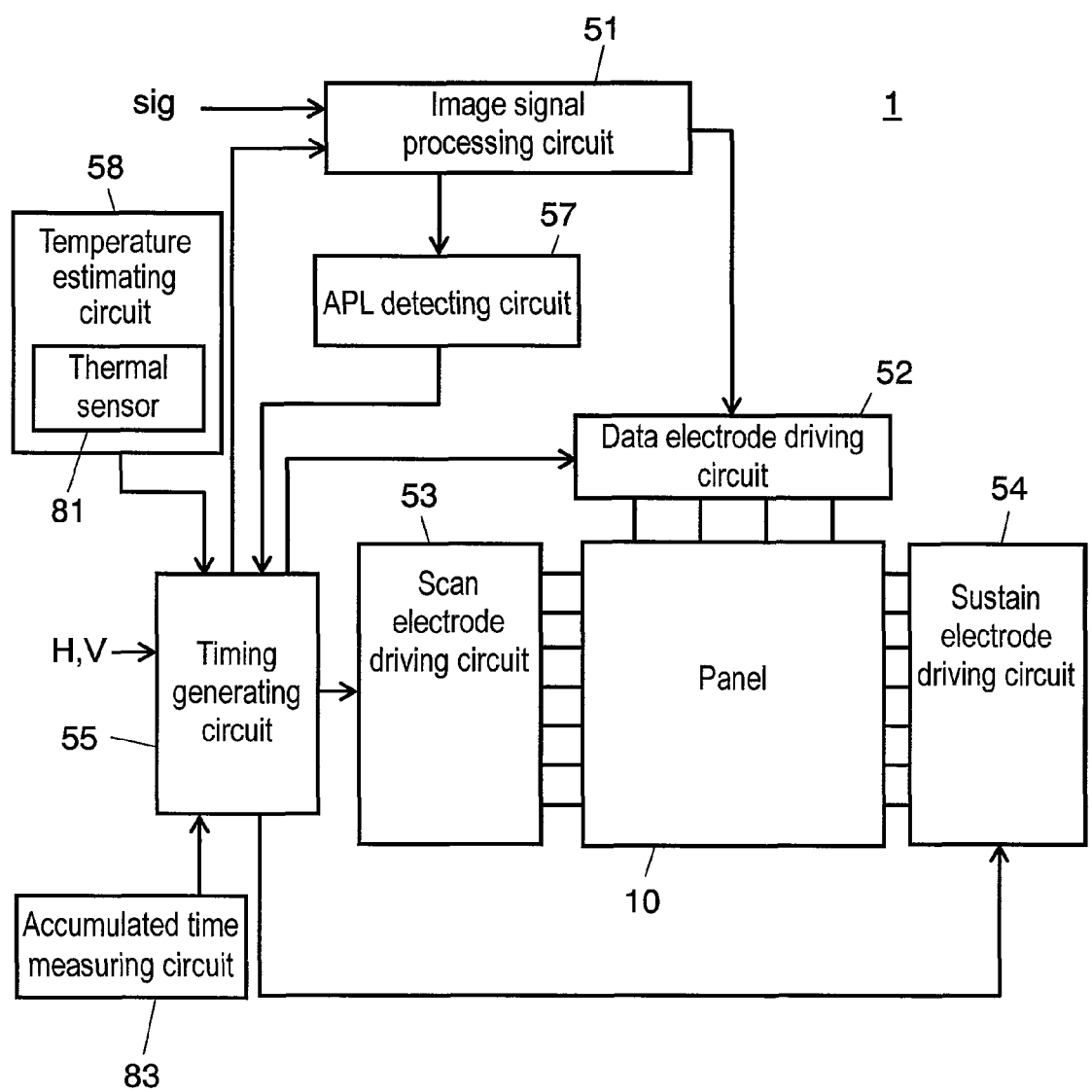
FIG. 12 is a circuit block diagram of a plasma display device in accordance with a second exemplary embodiment of the present invention.

FIG. 12 is a circuit block diagram of plasma display device 1 of exemplary embodiment 2 of the present invention. Accumulated time measuring circuit 83 has a generally-known integrating function of increasing the numerical value in constant increments every unit time, measures the power-on accumulated time, and outputs it to timing generating circuit 55. In other words, accumulated time measuring circuit 83 has a step of measuring the accumulation of power-on time of panel 10.

Timing generating circuit 55 has a step of estimating a lowest estimated temperature and highest estimated temperature of panel 10 based on the temperature around panel 10. In other words, timing generating circuit 55 determines the driving mode based on lowest estimated temperature θL(t) and highest estimated temperature θH(t) supplied form temperature estimating circuit 58, switches the subfield structure in the driving mode based on the APL of an image signal, and performs control so that initializing voltage Vr increases with extension in power-on accumulated time. Timing generating circuit 55 generates various timing signals for driving panel 10, and outputs them to respective circuit blocks.

The other circuit blocks are the same as those in embodiment 1.

Figure 13:
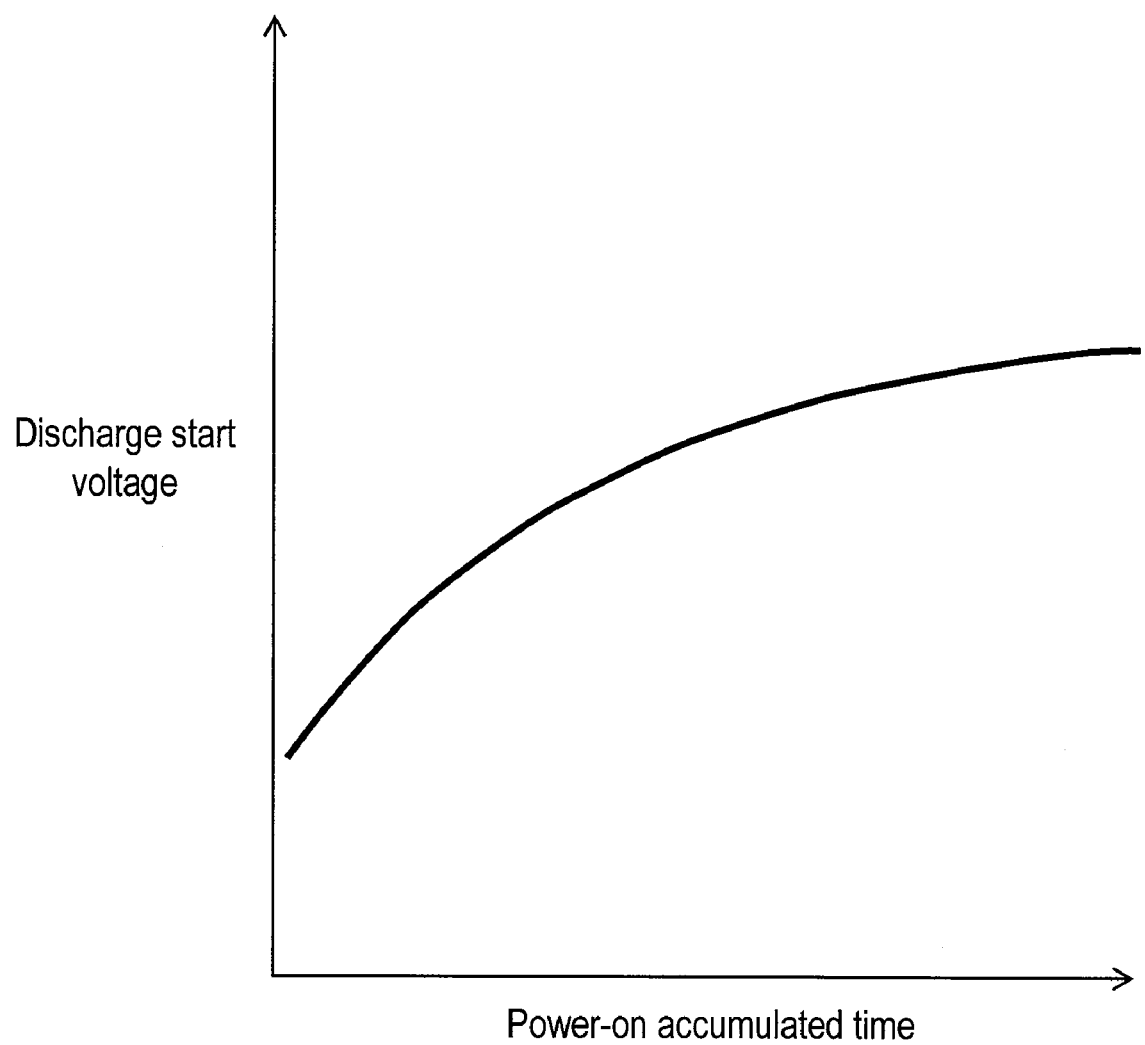
FIG. 13 is a pattern diagram showing the relationship between the power-on accumulated time and discharge start voltage of a panel in accordance with the second exemplary embodiment.

Next, the relationship between the power-on accumulated time and initializing voltage Vr is described. FIG. 13 is a pattern diagram showing the relationship between the power-on accumulated time and discharge start voltage of panel 10 of exemplary embodiment 2 of the present invention. As the power-on accumulated time of panel 10 increases, the discharge start voltage gradually increases. The discharge characteristics vary over time, so that the following problems occur. When initializing voltage Vr is set with reference to the discharge start voltage of panel 10 having a short power-on accumulated time, extending the power-on accumulated time increases the discharge start voltage. At this time, initializing voltage Vr becomes relatively low with respect to the discharge start voltage, hence the initializing discharge becomes weak, and sufficient wall voltage cannot be generated or the priming runs short. Thus, the initializing discharge can be insufficient. While, when initializing voltage Vr is previously set to be high in expectation of the variation over time of the discharge characteristics, initializing discharge becomes stronger than necessary in panel 10 having a short power-on accumulated time, light emission that is not related to the image display becomes strong, the black luminance increases, and the contrast can degrade.

However, the panel of the present embodiment has accumulated time measuring circuit 83, measures the power-on accumulated time, and performs control so that initializing voltage Vr increases with extension in power-on accumulated time. An image with sharp contrast can be displayed without un-stabilizing the initializing discharge regardless of the power-on accumulated time from the initial stage of the manufacturing of plasma display device 1.

Figure 14A:
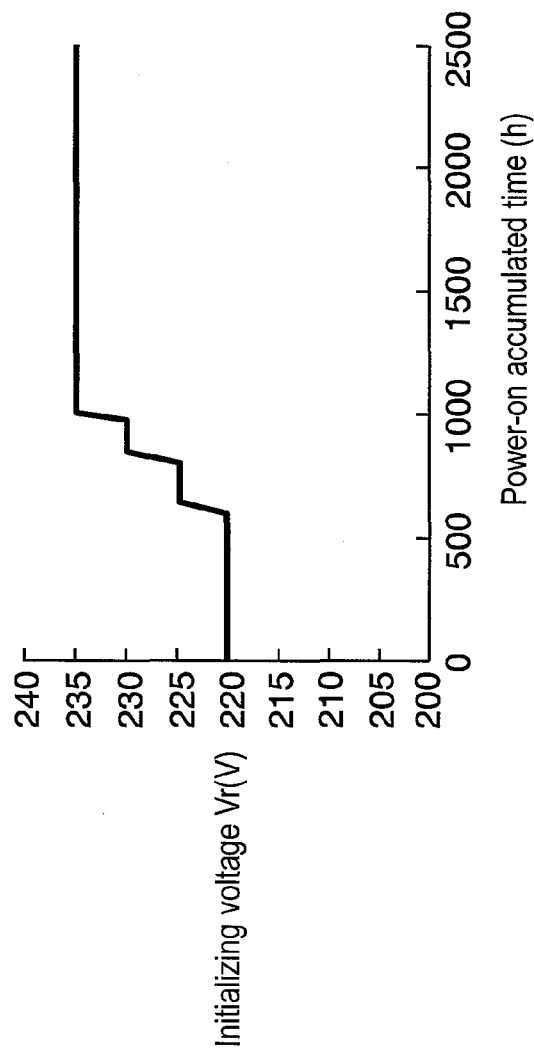
FIG. 14A shows a control method of initializing voltage in accordance with the second exemplary embodiment.
Figure 14B:
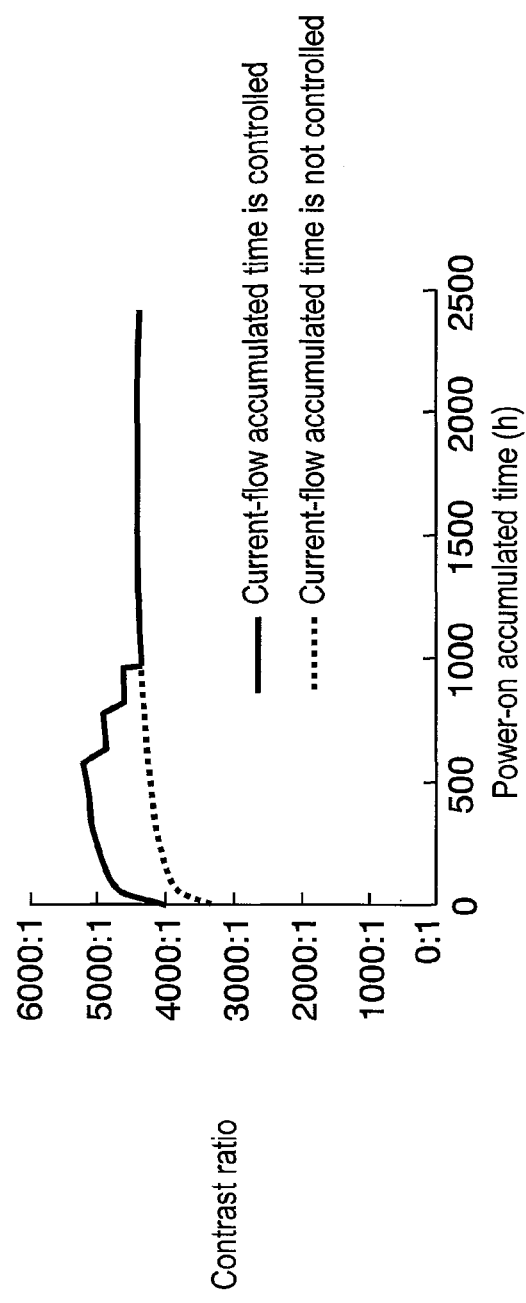
FIG. 14B shows a transition of the contrast ratio in the control method of initializing voltage in accordance with the second exemplary embodiment.

An example of the method of controlling initializing voltage Vr based on the power-on accumulated time is a method of continuously increasing initializing voltage Vr with extension in power-on accumulated time. In the present embodiment, a plurality of accumulated time thresholds are set, the power-on accumulated time supplied from accumulated time measuring circuit 83 is compared with the accumulated time thresholds, and initializing voltage Vr is increased whenever the power-on accumulated time exceeds the accumulated time thresholds. FIG. 14A and FIG. 14B show a control method of the initializing voltage and a transition of the contrast ratio in accordance with exemplary embodiment 2. FIG. 14A shows the relationship between the power-on accumulated time and initializing voltage Vr, and FIG. 14B shows the relationship between the power-on accumulated time and the contrast ratio. In exemplary embodiment 2, three accumulated time thresholds of 650 hours, 850 hours, and 1000 hours are set, and initializing voltage Vr is increased by 5 (V) when the power-on accumulated time exceeds 650 hours. The increase in initializing voltage is performed not only in normal-temperature driving mode but also in low-temperature driving mode and high-temperature driving mode, and regardless of the APL value. When the power-on accumulated time exceeds 850 hours, initializing voltage Vr is further increased by 5 (V). When the power-on accumulated time exceeds 1000 hours, initializing voltage Vr is further increased by 5 (V).

In the present embodiment, as the discharge start voltage is increased in response to extension in power-on accumulated time, initializing voltage Vr is increased. Therefore, image display with a contrast stabilized at a high level is allowed regardless of the power-on accumulated time.

In the present embodiment, the accumulated time thresholds are uniformly set in all driving modes of low-temperature driving mode, normal-temperature driving mode, and high-temperature driving mode, and initializing voltage Vr is uniformly increased. However, the present invention is not limited to this structure. The accumulated time thresholds may be set individually in each of the driving modes, and initializing voltage Vr may be increased at an individual voltage interval in each of the driving modes.

It is considered that the panel is hardly affected by increase over time in discharge start voltage when initializing voltage Vr is high, so that increase rate of the initializing voltage may be decreased as initializing voltage Vr becomes high.

In the present embodiment, the operation of comparing the power-on accumulated time with the accumulated time thresholds and increasing initializing voltage Vr is performed when plasma display device 1 is turned on, and initializing voltage Vr is not increased even when the power-on accumulated time exceeds the accumulated time thresholds during image display. This structure is formed for preventing the black luminance from varying during image display. When initializing voltage Vr is gradually increased so that the variation in black luminance is not so large, initializing voltage Vr may be increased at that point of time when the power-on accumulated time becomes the accumulated time thresholds or more.

The method of increasing initializing voltage Vr when the accumulated time increases is described in embodiment 2; however, a similar advantage is obtained even when the number of all-cell initializing subfields is increased.

In embodiment 1 and embodiment 2 of the present invention, when a hysteresis characteristic is applied in increasing and decreasing the number of all-cell initializing subfields, the frequent variation of the black luminance can be suppressed and hence the image display quality can be further improved.

A method of applying the hysteresis characteristic in switching among driving modes is described. FIG. 15A and FIG. 15B show examples of the relationship between highest estimated temperature θH and high-temperature threshold ThH in accordance with the present embodiment of the present invention. Since the number of all-cell initializations is two in normal-temperature driving mode or three in high-temperature driving mode in one filed time period, the number of all-cell initializations frequently changes to make variation in black luminance remarkable when highest estimated temperature θH frequently varies with respect to high-temperature threshold ThH as shown in FIG. 15A. In the present embodiment, as shown in FIG. 15B, two high-temperature thresholds ThH1 and ThH2 are used. High-temperature threshold ThH1 that is used in switching normal-temperature driving mode to high-temperature driving mode is set to be higher than high-temperature threshold ThH2 that is used in switching high-temperature driving mode to normal-temperature driving mode, thereby applying the hysteresis characteristic. Thus, frequent switch among the driving modes is prevented. A hysteresis characteristic can be similarly applied to the low-temperature threshold.

A hysteresis characteristic can be similarly applied in increasing and decreasing the number of all-cell initializations based on the APL. FIG. 16A and FIG. 16B show examples of the relationship between the APL and the number of all-cell initializations in accordance with the present embodiment of the present invention. Since the number of all-cell initializations is two for APL of 6% or higher or one for APL lower than 6%, the number of all-cell initializations frequently changes when the APL frequently varies with respect to 6% as shown in FIG. 16A. In FIG. 16B, two thresholds 5% and 7% are set for the APL. The threshold in increasing the number of all-cell initializations from one to two is set to be 7%, and the threshold in decreasing the number of all-cell initializations from two to one is set to be 5%, thereby applying the hysteresis characteristic.

When the hysteresis characteristic is applied in changing the number of all-cell initializations, the number of all-cell initializations does not frequently change, and frequent variation in black luminance can be prevented.

In embodiment 2, the method of controlling the number of all-cell initializations and the initializing voltage based on not only the power-on accumulated time of panel 10 but also the APL of the image signal and sensor temperature θs. However, a principal objective of embodiment 2 is the control based on the power-on accumulated time of panel 10, so that the control based on the APL of the image signal, the sensor θs, or both of them may be omitted.

In the embodiments of the present invention, the xenon partial pressure of the discharge gas is set 10%. However, even when the xenon partial pressure is another value, the driving voltage is set at a value corresponding to panel 10.

Each specific numerical value used in the embodiments of the present invention is simply one example, is appropriately set at an optimal value in response to the characteristics of panel 10 and specification of plasma display device 1.

Industrial Applicability

A panel driving method and a plasma display device of the present invention allow stable and high-speed writing with the increase in black luminance suppressed in a large temperature range, from the initial stage of the use, and regardless of the power-on accumulated time. Therefore, they are effectively used in a wall-hanging TV or a large monitor.

The invention claimed is:

1. A driving method of a plasma display panel for displaying an image comprising a step of measuring a power-on accumulated time of the plasma display panel, wherein
   one field includes a plurality of subfields having:
      an initializing period for causing initializing discharge in a discharge cell, the discharge cell having a display electrode pair including a scan electrode and a sustain electrode;
      an addressing period for causing writing discharge in the discharge cell; and
      a sustaining period for causing sustaining discharge in the discharge cell where the writing discharge has been caused,
   the initializing period of at least one of the plurality of subfields includes:
      an all-cell initializing operation for applying initializing voltage, the initializing voltage causing initializing discharge in all discharge cells for displaying an image;
   the initializing period of at least another one of the plurality of subfields includes:
      a selection initializing operation for selectively causing initializing discharge in a discharge cell where the sustaining discharge has been caused in the last subfield, and
   the number of subfields in the one field having the initializing period including the all-cell initializing operation is controlled based on the accumulated time.

2. A driving method of a plasma display panel for displaying an image comprising a step of estimating a lowest estimated temperature and a highest estimated temperature of the plasma display panel based on temperature around the plasma display panel, wherein
   one field includes a plurality of subfields having:
      an initializing period for causing initializing discharge in a discharge cell, the discharge cell having a display electrode pair including a scan electrode and a sustain electrode;
      an addressing period for causing writing discharge in the discharge cell; and
      a sustaining period for causing sustaining discharge in the discharge cell where the writing discharge has been caused,
   the initializing period of at least one of the plurality of subfields includes:

an all-cell initializing operation for applying initializing voltage, the initializing voltage causing initializing discharge in all discharge cells for displaying an image;

the initializing period of at least another one of the plurality of subfields includes:

a selection initializing operation for selectively causing initializing discharge in a discharge cell where the sustaining discharge has been caused in the last subfield, and the number of subfields in the one field having the initializing period including the all-cell initializing operation is controlled based on the lowest estimated temperature and the highest estimated temperature.

3. A plasma display device comprising:

a plasma display panel having a plurality of discharge cells, the discharge cells having a display electrode pair including a scan electrode and a sustain electrode, an accumulated time measuring circuit for measuring a power-on accumulated time of the plasma display panel; and a driving circuit for driving the plasma display panel with a subfield structure, the subfield structure comprising one field including a plurality of subfields having:

an initializing period for causing initializing discharge in a discharge cell, the discharge cell having a display electrode pair including a scan electrode and a sustain electrode;

an addressing period for causing writing discharge in the discharge cell; and a sustaining period for causing sustaining discharge in the discharge cell where the writing discharge has been caused, wherein the initializing period of at least one of the plurality of subfields includes:

an all-cell initializing operation for causing initializing discharge in all discharge cells for displaying an image in an initializing period;

wherein the initializing period of at least another one of the plurality of subfields includes:

a selection initializing operation for selectively causing initializing discharge in a discharge cell where the sustaining discharge has been caused in the last subfield in the initializing period, and wherein the driving circuit controls the number of subfields in the one field having the initializing period including the all-cell initializing operation based on the accumulated time measured by the accumulated time measuring circuit.

4. A plasma display device comprising:

a plasma display panel having a plurality of discharge cells, the discharge cells having a display electrode pair including a scan electrode and a sustain electrode;

a thermal sensor for measuring temperature around the plasma display panel;

a driving circuit that drives the plasma display panel with a subfield structure, the subfield structure comprising one field including a plurality of subfields having:

an initializing period for causing initializing discharge in a discharge cell, the discharge cell having a display electrode pair including a scan electrode and a sustain electrode;

an addressing period for causing writing discharge in the discharge cell; and a sustaining period for causing sustaining discharge in the discharge cell where the writing discharge has been caused, wherein the initializing period of at least one of the plurality of subfields includes:

an all-cell initializing operation for causing initializing discharge in all discharge cells for displaying an image in an initializing period;

wherein the initializing period of at least another one of the plurality of subfields includes:

a selection initializing operation for selectively causing initializing discharge in a discharge cell where the sustaining discharge has been caused in the last subfield in the initializing period, and wherein the driving circuit controls the number of subfields in the one field having the initializing period including the all-cell initializing operation based on the measured temperature by the thermal sensor.

* * * * *

UNITED STATES PATENT AND TRADEMARK OFFICE
CERTIFICATE OF CORRECTION

| | | |
|---|---|---|
| PATENT NO. | : 8,013,808 B2 | Page 1 of 1 |
| APPLICATION NO. | : 11/815899 | |
| DATED | : September 6, 2011 | |
| INVENTOR(S) | : Minoru Takeda et al. | |

It is certified that error appears in the above-identified patent and that said Letters Patent is hereby corrected as shown below:

Title Page 2, FIELD [56], References Cited, FOREIGN PATENT DOCUMENTS, please delete the following duplicate references.

"JP  2000-242224 A          9/2000

JP  2005-215132 A          8/2005

JP  2005-241806 A          9/2005"

Signed and Sealed this
Seventh Day of February, 2012

David J. Kappos
*Director of the United States Patent and Trademark Office*